Figure 1A:
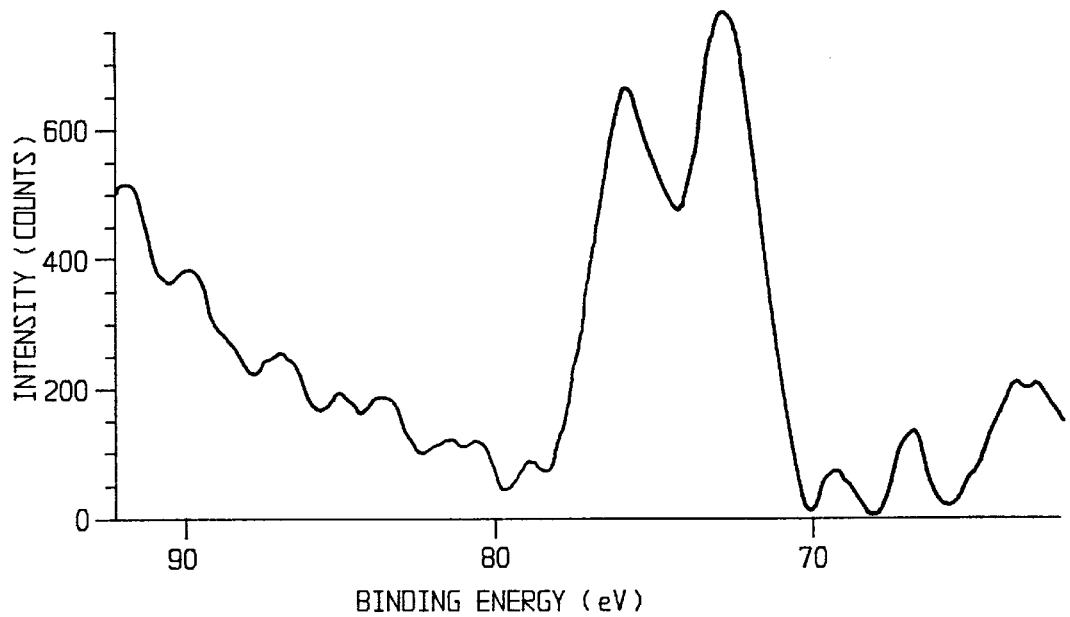

United States Patent [19]
Rajaram et al.

[11] Patent Number: 5,993,762
[45] Date of Patent: Nov. 30, 1999

[54] METHOD OF USING CATALYST CONTAINING NOBLE METAL AND CERIUM DIOXIDE

[75] Inventors: Raj R. Rajaram, Slough; John W. Hayes, Reading; Graham P. Ansell, Twyford; Helen A. Hatcher, Reading, all of United Kingdom

[73] Assignee: Johnson Matthey Public Limited Company, London, United Kingdom

[21] Appl. No.: 08/555,034

[22] Filed: Nov. 8, 1995

Related U.S. Application Data

[62] Division of application No. 08/164,405, Dec. 10, 1993, Pat. No. 5,480,854.

[30] Foreign Application Priority Data

Dec. 18, 1992 [GB] United Kingdom .................. 9226434

[51] Int. Cl.[6] ........................... B01D 53/56; B01D 53/94
[52] U.S. Cl. .................................... 423/213.2; 423/213.5; 423/239.1; 423/245.3; 423/247; 423/659; 423/437.2
[58] Field of Search ............................ 423/437.2, 213.5, 423/659, 239.1, 245.3, 247, 213.2; 60/299, 302; 502/304

[56] References Cited

U.S. PATENT DOCUMENTS 2,030,283  2/1936  De Rewal ............................... 502/304
3,173,957  3/1965  McDaniel et al. ...................... 502/304

(List continued on next page.)

FOREIGN PATENT DOCUMENTS 2044445  12/1991  Canada .
0009802   4/1980  European Pat. Off. .

(List continued on next page.)

OTHER PUBLICATIONS

Gmelin Handbuch der Anorganischen Chemie, pp. 78–81 (1974) (with translation of excerpts).
*Journal of Catalyst*, 'The Oxidation of CO and Hydrocarbons over Noble Metal Catalysts', Yao, 87, (1984), pp. 152–162.
*Journal of Catalysts*, 'Ceria in Automotive Exhaust Catalysts', Yao et al., 86, (1984), pp. 254–265.
*Catalysis and Automotive Pollution Control II*, 'The Role of Ceria in Three–Way Catalysts', edited by A. Crucq, published by Elsevier Science Publishers B.V., Amsterdam (1991), pp. 139–152.
J. Chem. Soc. Faraday Trans., 1991, 87(17), 'Carbon Dioxide Hydrogenation over $Au/ZrO_2$ Catalysts from Amorphous Precursors: Catalytic Reaction Mechanism', Koeppel et al., pp. 2821–2828.
*Journal of Catalysts*, 'Comparison of the Performance Characteristics of $Pt/SnO_x$ and $Au/MnO_x$ Catalysts for Low–Temperature CO Oxidation', Gardner et al., 129, (1991), pp. 114–120.
*Journal of Catalysts*, 'CO Oxidation over Pd and Cu Catalysts', Choi et al., 127, (1991), pp. 465–488.
*Successful Design of Catalysts*, 'Fine Structure of Novel Gold Catalysts Prepared by Coprecipitation', edited by T. Inui, published by Elsevier Science Publishers B.V., Amsterdam (1988) pp. 33–42.

Primary Examiner—Steven P. Griffin
Assistant Examiner—Peter DiMauro
Attorney, Agent, or Firm—Stevens, Davis, Miller & Mosher, L.L.P.

[57] ABSTRACT

A reaction comprising the oxidation of carbon monoxide to carbon dioxide, eg in vehicle exhausts, employs a catalyst composed of metal oxide, eg. ceria, particles among which are uniformly incorporated noble metal particles, the particles having such a high interaction that, without hydrogen reduction pre-treatment, the catalyst exhibits the formation of anionic vacancies on the metal oxide surface at a temperature lower than does the corresponding catalyst prepared by impregnation. The catalyst employed is preferably prepared by co-precipitation.

13 Claims, 15 Drawing Sheets

U.S. PATENT DOCUMENTS

| | | | |
|---|---|---|---|
| 3,878,131 | 4/1975 | Hayes | 502/330 |
| 4,149,998 | 4/1979 | Tauster et al. | |
| 4,683,219 | 7/1987 | Cotton et al. | |
| 4,937,219 | 6/1990 | Haruta et al. | 502/147 |
| 5,051,394 | 9/1991 | Haruta | 502/324 |
| 5,202,300 | 4/1993 | Funabiki et al. | 502/304 |
| 5,516,741 | 5/1996 | Gascoyne | 423/239.1 |

FOREIGN PATENT DOCUMENTS

| | | |
|---|---|---|
| 107471 | 5/1984 | European Pat. Off. . |
| 0112613 | 7/1984 | European Pat. Off. . |
| 0171640 | 2/1986 | European Pat. Off. . |
| 0306944 | 3/1989 | European Pat. Off. . |
| 0306945 | 3/1989 | European Pat. Off. . |
| 0330224 | 8/1989 | European Pat. Off. . |
| 0337446 | 10/1989 | European Pat. Off. . |
| 0428753 | 5/1991 | European Pat. Off. . |
| 0457480 | 11/1991 | European Pat. Off. . |
| 0499402 | 8/1992 | European Pat. Off. . |
| 53-116290 | 10/1978 | Japan . |
| 4004043 | 1/1992 | Japan . |
| 1056580 | 1/1967 | United Kingdom . |
| 2122912 | 1/1984 | United Kingdom . |
| 2234450 | 2/1991 | United Kingdom . |

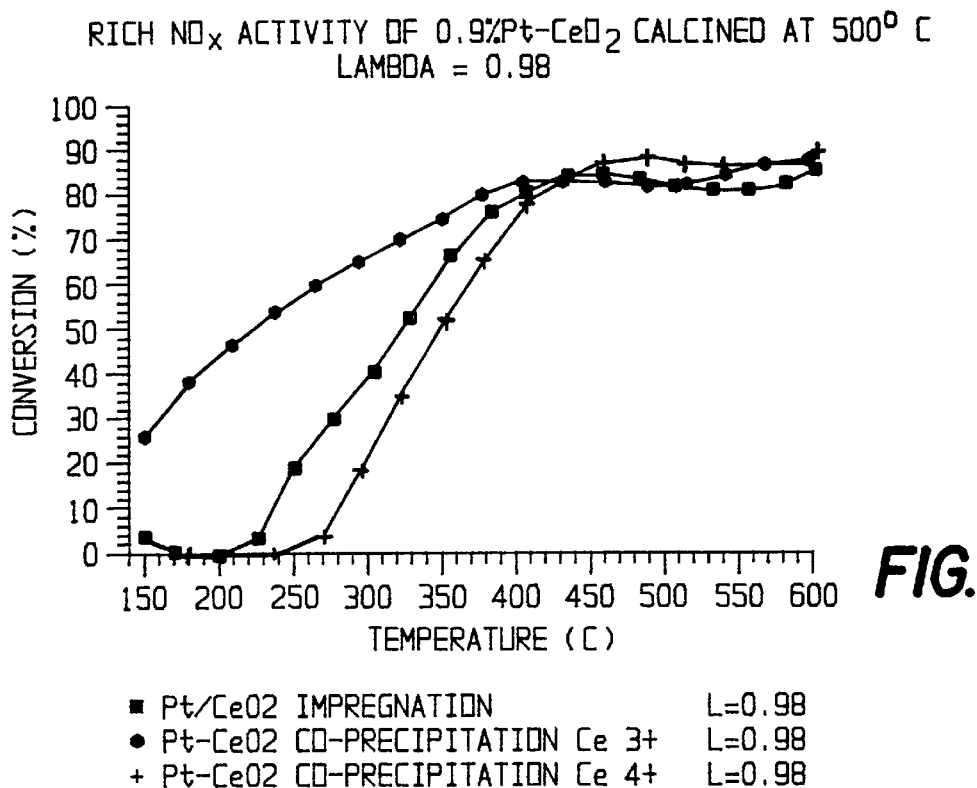
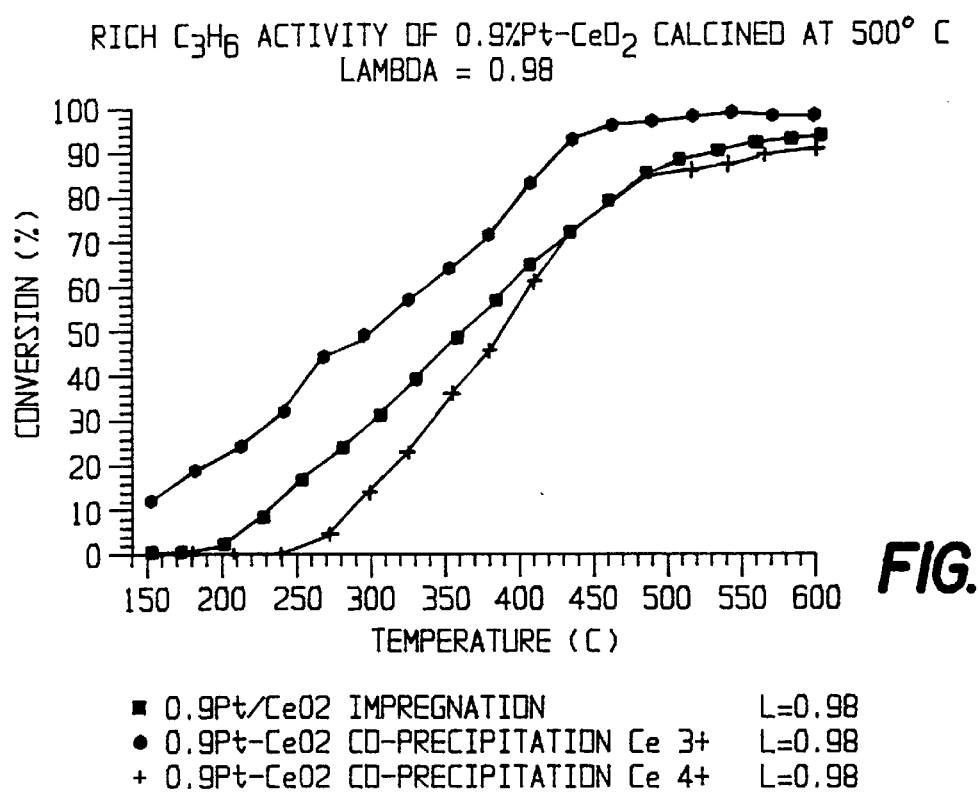

- 0.18%Rh+0.9%Pt/Al2O3-CeO2
- 4%Pd+0.5%Pt/CeO2 CO-PRECIPATED Ce3+

- 4Pd-0.5Pt-CeO2 CALCINED 900° C

METHOD OF USING CATALYST CONTAINING NOBLE METAL AND CERIUM DIOXIDE

This is a Divisional of application Ser. No. 08/164,405 filed Dec. 10, 1993 now U.S. Pat. No. 5,480,854.

This invention relates to a method of conducting a chemical reaction comprising the oxidation of carbon monoxide to carbon dioxide employing a catalyst, to an engine whose exhaust apparatus contains the catalyst in order to combat air pollution, to a certain such catalyst containing ceria and its preparation and use, and to the preparation of ceria.

Transition metal catalysts, especially those involving Group VIII metals, are usually prepared by dispersing the active component on high surface area carriers, such as refractory inorganic oxides, to achieve maximum specific metal surface areas and high thermal stability. The support material must usually have a high surface area, and various parameters are considered in selecting a support for metal catalysts. Metal oxides are the most commonly used carrier, and their dominance is a consequence of their generally high thermal and chemical stability, coupled with the knowledge of preparation of the materials with high surface areas. Support materials can be classified into either inert supports, like $SiO_2$, supplying high surface area for dispersing the active component, or catalytically active supports, like $SiO_2$-$Al_2O_3$ or zeolite, for bifunctional catalysts. The nature of the carrier oxide can affect the size and morphology of the metal particles, either during deposition or activation, an effect generally referred to as non-specific metal-metal oxide interaction. In certain other cases, the support can influence the active component by a strong interaction, an example being partially reduced $TiO_2$. Support for the view that the metal oxide support can significantly influence the catalytic properties of the metal in a more specific manner was provided by Tauster and co-workers (U.S. Pat. No. 4,149,998) who described the unusual effects observed in certain metal-metal oxide systems and introduced the acronym SMSI (strong metal support interaction). The SMSI phenomenon, caused by the high temperature reduction of Group VIII metals dispersed on certain metal oxides, is characterised by a suppression in the metal's ability to chemisorb CO or $H_2$, increased catalytic activity in $CO/H_2$ reactions, and decreased activity for structure sensitive reactions such as alkane hydrogenolysis, and is reversible in the sense that mild oxidation will restore the catalyst to its original state. The dispersion of the metal particles, thus the metal-metal oxide interfacial area, and the temperature of $H_2$ reduction will both influence the extent of the SMSI effect. The various hypotheses invoked to explain the SMSI phenomenon include explanations involving a geometric effect caused by migration of oxidic moieties from the support to the surface of the metal particles, an electronic effect caused by charge transfer from cations on the oxide surface to the metal, or the creation of new active sites at the metal-metal oxide interface.

The concept that a $H_2$ reduction pre-treatment could influence catalytic activities of metals supported on metal oxides to enhance the low temperature CO oxidation activities of certain metal-metal oxides catalysts has been described in various patent specifications, for instance European patent specification 0337446. These do not specify whether the induced changes are due to a SMSI-type effect or the simple reduction of the metal component. The advent of automobile exhaust catalysts has led to further intensive investigations of the interaction of noble metals with metal oxides, notably $CeO_2$. Yu Yao (J of Catalysis, 87, 152–162 (1984)) has shown that treatment of Pd, Pt or Rh catalysts supported on $CeO_2$-$Al_2O_3$ under reducing conditions results in a dramatic, but transient, enhancement of catalytic activity for the oxidation of CO and hydrocarbons. Other research groups have studied specifically the Pt-$CeO_2$ interaction after reduction pre-treatment and have shown enhancement in conversion activity for CO oxidation and $NO_x$ reduction. The degree of the Pt-$CeO_2$ interaction was dependent on both the Pt and $CeO_2$ crystallite sizes. The catalysts were designed to achieve highly dispersed Pt on high surface area $CeO_2$ (for high Pt-$CeO_2$ interfacial area) by impregnation techniques, prior to the reduction pre-treatment.

The strong metal-metal oxide interaction described in this prior literature has been observed on catalysts prepared by conventional impregnation techniques. Such procedures do not lead to a material with intrinsically unique or unusual catalytic properties. The treatment of these systems in a reducing atmosphere at high temperature induces the reported unique properties and activities of these catalysts. In addition, many of these systems are reversible in that a subsequent treatment in an oxidising atmosphere at a certain temperature, normally greater than 20° C., negates these unique catalytic properties and therefore reverses any changes in the structure or electronic character which account for the unique catalytic properties and can severely impair the usefulness of such catalyst systems.

The present invention relates to metal-metal oxide catalysts which have unique and unusual catalytic properties which are intrinsic, not requiring a separate reduction pre-treatment to manifest them, and which are stable, not being reversible in nature.

Accordingly, the invention provides a method of conducting a chemical reaction comprising the oxidation of carbon monoxide to carbon dioxide employing a catalyst composed of metal oxide particles among which are uniformly incorporated noble metal particles, the catalyst having such a high interaction between the noble metal particles and the metal oxide particles that, without hydrogen reduction pre-treatment, it exhibits the formation of anionic vacancies on the metal oxide surface at a temperature lower than does the corresponding catalyst, without hydrogen reduction pre-treatment, containing the same amount of the metal oxide particles and noble metal particles and prepared by impregnating the metal oxide particles with noble metal precursor and calcining to convert the precursor to the noble metal particles.

The invention provides also an engine whose exhaust apparatus contains the catalyst in order to combat air pollution.

The invention also provides as a novel composition of matter the catalyst wherein the metal oxide comprises $CeO_2$ and the noble metal is one or more of Pt, Pd, Rh and Au.

The invention provides also a process for preparing a catalyst composed of metal oxide particles comprising $CeO_2$ among which are uniformly incorporated noble metal particles, the noble metal being one or more of Pt, Pd, Rh and Au, which process comprises co-precipitating the noble metal particles and the metal oxide particles comprising $CeO_2$.

The invention also provides a method of conducting a chemical reaction employing the catalyst wherein the metal oxide comprises $CeO_2$ and the noble metal is one or more of Pt, Pd, Rh and Au.

The invention provides also a process for preparing ceria, which process comprises adding a solution of ceria precursor to a solution of a base to precipitate cerium hydroxide and heating the cerium hydroxide to convert it to ceria.

By noble metal is meant in this specification one or more of Ru, Rh, Pd, Os, Ir, Pt and Au. Preferably, the noble metal is one or more of Pt, Pd, Rh and Au, especially one or more of Pt, Pd and Rh. The catalyst usually contains 0.1 to 30% by weight of the noble metal particles based on the total weight of the noble metal particles and the metal oxide particles. In one embodiment, the catalyst contains 0.1–10% by weight Pt and 0.1–20% by weight palladium on this basis, for instance when the metal oxide is $CeO_2$.

The metal oxide preferably comprises (ie consists of or includes) one or more of $CeO_2$, $ZrO_2$, $TiO_2$ and $SnO_2$, especially one or more of $CeO_2$, $ZrO_2$ and $SnO_2$, particularly $CeO_2$. The metal oxide preferably contains 80–100% by weight of such oxides. To increase the thermal stability of the catalyst, particularly when $CeO_2$ is employed as metal oxide, the metal oxide can include a minor amount of a secondary metal oxide to decrease the extent of sintering the main metal oxide during high temperature exposure. The amount of secondary metal oxide, when it is employed, is usually between 1 and 20% by weight of the metal oxide. The secondary metal oxide can be, for instance, one or more of $ZrO_2$, $Al_2O_3$, $La_2O_3$ and BaO, particularly $ZrO_2$ and/or $Al_2O_3$.

The present catalyst has the noble metal particles uniformly incorporated among the metal oxide particles. The interaction between the two sets of particles is accordingly even and contrasts, for instance, with metal oxide particles whose surface has been impregnated with a noble metal precursor and which have been calcined to convert the precursor to noble metal particles. In addition, the interaction between the two sets of particles in the present catalyst is of unique type, as discussed above. The interaction between the noble metal particles and the metal oxide particles is so high that, without hydrogen reduction pre-treatment, the catalyst exhibits the formation of anionic vacancies on the metal oxide surface at a temperature lower, usually by at least 40° C., preferably by at least 80° C., especially by at least 200° C., than does the corresponding catalyst, without hydrogen reduction pre-treatment, prepared by impregnation. The corresponding catalyst prepared by impregnation contains the same amount of the metal oxide particles and the same amount of the noble metal particles, but has been prepared by impregnating the metal oxide particles with noble metal precursor and calcining to convert the precursor to the noble metal particles. This is the well known, conventional, method of preparation. As discussed above, hydrogen reduction pre-treatment has been required in the past in order to activate catalysts composed of metals and metal oxides to a strong metal-metal oxide interaction. The formation of anionic vacancies on the metal oxide surface enables the present catalyst to catalyse reactions such as those comprising the oxidation of carbon monoxide to carbon dioxide. The temperature at which the formation of anionic vacancies is exhibited is conveniently found by temperature programmed reduction. This analytical technique shows the temperature at which reduction of surface anion, and hence the formation of anionic vacancies, occurs. The temperature at which the corresponding catalyst prepared by impregnation exhibits the formation of anionic vacancies can be found by the same analytical technique, but is generally given in the literature, for instance (1) Yao H C and Yu Yao Y F, J of Catalysis, 86, 254 (1984) and (2) Diwell A F, Rajaram R R, Shaw H A and Truex T J, "Studies in Surface Science and Catalysis", vol 71 (Capoc II), edited by Crucq A and published by Elsevier (1991), page 139.

The metal-metal oxide interaction in the present catalyst involves a high metal-metal oxide contact area. Accordingly, the size of their particles should be small. The noble metal particle diameter is preferably less than 10 Å. The metal oxide particle diameter is preferably up to 250 Å, for instance 10–250 Å.

In a particular embodiment, the metal oxide phase partially or completely encapsulates the metal particles, resulting in significant suppression of the carbon monoxide chemisorption ability of the metal particles. For instance, when the noble metal is Pt and the metal oxide $CeO_2$, the carbon monoxide chemisorption value of CO:noble metal is preferably less than 0.2.

The strong metal-metal oxide interaction in the present catalyst permits the reduction of surface anions on the oxide surface at unusually low temperature. The catalyst is preferably such that tested on the simulated car exhaust gas mixture defined in Table 4 hereafter under conditions rich of stoichiometric at lambda=0.98 and at a mass hourly space velocity of 60 liters of gas mixture per hour per g of catalyst, it converts one or more, preferably two or three, and especially all three, of:

(a) 50% of the CO at a temperature lower than 250° C., preferably lower than 150° C.;

(b) 50% of the NO at a temperature lower than 300° C., preferably lower than 250° C.; and (c) 50% of the $C_3H_6$ at a temperature lower than 350° C., preferably lower than 300° C.

The present catalyst, with its high metal-metal oxide interaction, is preferably that preparable by co-precipitation of the noble metal particles and the metal oxide particles. Co-precipitation is a very effective method of incorporating the noble metal particles uniformly among the metal oxide particles to achieve their high interaction. The co-precipitation can be carried out in a manner known generally per se. Although co-precipitation of noble metal particles and metal oxide particles is known in certain instances, for example from (A) European patent specification 457480 and (B) Koeppel et al, J Chem Soc, Faraday Trans, 87, 17, page 2821 (1991), it was not realised before that catalysts prepared in this way are so advantageous in chemical reactions comprising the oxidation of carbon monoxide to carbon dioxide. The present catalyst wherein metal oxide comprises $CeO_2$ and the noble metal is one or more of Pt, Pd, Rh and Au, is a novel composition of matter, and the invention provides it as such. Co-precipitating the noble metal particles and the metal oxide particles comprising $CeO_2$ automatically gives the high interaction between the two sets of particles which is characteristic of the present catalyst and which is evident from its exhibiting, without hydrogen reduction pre-treatment, the formation of anionic vacancies on the metal oxide surface at a temperature lower than does the corresponding catalyst, without hydrogen reduction pre-treatment, prepared by impregnation.

It will be understood that the present co-precipitation may produce a precipitate which does not have the metal oxide present as such but in a form, such as an hydroxide, which is then converted to the metal oxide. The conversion can be accomplished for instance by heating, for example at 50–500° C.

The present co-precipitation is carried out preferably at 50–120° C., especially from boiling aqueous solution. The co-precipitation is preferably carried out so that it occurs in a controlled rather than a sudden manner. In certain cases, while forming the high metal-to-metal oxide interfacial area, partial or complete encapsulation of the metal particles by the oxide phase occurs, resulting in significant suppression of the carbon monoxide chemisorption ability of the well dispersed metal particles. The co-precipitation method generates the metal-metal oxide interaction without requirement for reduction in hydrogen to manifest it, and also stabilises the interaction, as it is maintained even after air calcination at high temperature (for instance at a temperature between 500 and 900° C.).

In one aspect of preparation, in the co-precipitation the noble metals particles, particularly of one or more of Pt, Pd, Rh and Au, are co-precipitated from colloid of the metal. The colloid can be pre-formed. For instance, a Pt colloid sol can be made by reduction of chloroplatinic acid with ethanol in the presence of a stabilising agent. In a particular technique, the co-precipitation is effected by admixing noble metal colloid, a solution of metal oxide precursor, and a base. The noble metal colloid can be formed in situ by a reducing agent.

In another aspect of preparation, in the co-precipitation the noble metal particles, particularly of one or more of Pt, Pd and Au, are co-precipitated by reduction of hydrolysed noble metal salt. In this aspect of preparation, the catalyst usually contains 0.5–20, preferably 0.5–5, % by weight of the noble metal particles based on the total weight of the noble metal particles and the metal oxide particles. The noble metal salt which is hydrolysed can be any convenient soluble salt; in the case of platinum, for instance, chloroplatinic acid, tetraammine platinum hydroxide or tetraammine platinous chloride can be employed. The hydrolysis can be brought about by a base. The reduction can be brought about by a reducing agent. Peculiar to the case of metal oxide being $CeO_2$, metal oxide precursor is advantageously used to reduce the hydrolysed metal salt. This is very surprising; such a possibility has never been alluded to in the prior art. In this case, the cerium oxide precursor must be $Ce^{3+}$ salt in solution; as illustrated hereafter, corresponding use of a cerium oxide precursor in the form of $Ce^{4+}$ salt in solution does not produce the present catalyst with its unique structure and advantageous properties. The $Ce^{3+}$ salt can be any soluble $Ce^{3+}$ salt.

In the present preparation, any soluble base can generally be used as precipitant, such as NaOH, KOH, $NH_4OH$ or an organic base. The preferred base is NaOH. Precipitation of the metal oxide can be brought about by reaction of a solution of a base and a solution of metal oxide precursor. The metal oxide precursor can be any soluble salt which can be converted to metal oxide in this way, except for the special case involving the cerium oxide precursor, when used as reducing agent, being in the $Ce^{3+}$ form as discussed above (but the cerium oxide precursor can be a salt in which the cerium is in any oxidation state in the aspect involving a noble metal colloid). When the metal oxide in the catalyst includes a secondary metal oxide as discussed above, the secondary metal oxide can be incorporated during the co-precipitation by similarly precipitating it from a solution of a salt. Any reducing agent in the present preparation can be for instance formaldehyde or sodium formate.

In the present preparation involving a solution of a base, a solution of metal oxide precursor is preferably added to the solution of the base, so that the precipitation is reached from the basic side, rather than the solution of the base being added to the solution of the metal oxide precursor, so that the precipitation is reached from the acidic side. It has been found that this preferred order of addition tends to result in a catalyst of higher surface area, particularly when the metal oxide is $CeO_2$.

It has been found that this order of addition is thus advantageous in the case of $CeO_2$ whether or not the present noble metal moiety is employed; $CeO_2$ of surprisingly higher surface area is produced. Accordingly, the invention provides a process for preparing ceria, which process comprises adding a solution of ceria precursor to a solution of a base to precipitate cerium hydroxide and heating the cerium hydroxide to convert it to ceria. The process can be conducted in the same way as the co-precipitation described herein except that the noble metal moiety need not be present; a different or no catalytically active component moiety can be employed instead of the noble metal moiety. The base is preferably NaOH. The cerium hydroxide precipitated can be $Ce^{3+}$ hydroxide or $Ce^{4+}$ hydroxide. The hydroxide is usually heated in air. It is usually heated at a temperature of 50–500° C. The ceria usually has a Brunauer Emmett Teller surface area of at least 100 $m^2g^{-1}$. The ceria is advantageously used as a component of a catalyst. The component can be catalytically active or a carrier.

The present catalyst has a high metal-metal oxide interaction, so as to promote the reduction of surface anions on the oxide surface at unusually low temperature. Temperature programmed reduction, a technique routinely used to characterise supported metal catalysts, can be used to identify the desirable interaction. It is known that the presence of a metal can sometimes catalyse the reduction of an oxide by providing spillover atomic hydrogen, which first creates $OH_s^-$ groups with the surface lattice anions. The dehydration of these $OH_s^-$ groups will then lead to the formation of anionic vacancies. Yao and Yu Yao, in their reference specified above, have suggested, for instance, that there are two kinds of lattice oxygen in $CeO_2$, which can be removed by $H_2$ at 500° C. and 800° C. respectively. The addition by conventional impregnation technique of a noble metal such as Pt, Rh or Pd to $CeO_2$ will catalyse the reduction of the first type of oxygen, associated with conversion of surface oxide anion to oxygen vacancy, and not the second type of oxygen, the bulk oxygen anion, suggesting that the metal interacts mainly with the surface of the oxide. The high metal-metal oxide interaction in the present invention enables the formation of such vacancies at lower temperature than that observed for corresponding impregnated catalysts. The mechanism by which the metal promotes the production of anionic vacancies on the oxide surface in the present invention may not necessarily be due to the spillover of atomic hydrogen from the metal to the oxide, as gold, a metal known for its inability to dissociate hydrogen, promotes the effect in the present invention.

The present catalyst wherein the metal oxide comprises $CeO_2$ and the noble metal is one or more of Pt, Pd, Rh and Au is remarkably effective in catalysing chemical reactions. It can be employed without hydrogen reduction pre-treatment. It can be employed after a calcination pre-treatment in air at between 300 and 900° C., usually between 500 and 900° C. The catalyst is particularly useful when employed for conducting reactions at lower temperatures than previously were employed. It is especially useful where the reaction is a redox reaction. The present catalyst is remarkably effective in catalysing a chemical reaction comprising the oxidation of carbon monoxide to carbon dioxide. Again, the catalyst, whether or not the metal oxide comprises $CeO_2$ and the noble metal is one or more of Pt, Pd, Rh and Au, can be employed without hydrogen reduction pre-treatment. Again, the catalyst can be employed after a calcination pre-treatment in air at between 300 and 900° C., usually between 500 and 900° C. Again, it is particularly useful when employed for conducting reactions at lower temperatures than previously were employed. The catalyst is especially useful for the oxidation of carbon monoxide and hydrocarbon to carbon dioxide and water and the reduction of nitrogen oxides to nitrogen. The catalyst can be used for conducting this particular reaction in the exhaust apparatus of an engine, especially an internal combustion engine in a vehicle, in order to combat air pollution. The catalyst is of particular interest, because of its low temperature activity, for the treatment of vehicle exhaust emissions at low temperature during warm-up.

The present catalyst can be employed as the sole catalyst or together with another catalyst, usually comprising one or more of Pt, Pd and Rh, for instance Rh optionally with Pt and/or Pd. The present catalyst can be formulated in the usual way to catalyse chemical reactions. When it is employed as sole catalyst, it generally does not need a separate high surface area carrier such as is discussed above in relation to transition metal catalysts. When it is employed together with another catalyst, a high surface area carrier is often useful to carry both catalysts. For instance, the present catalyst can be dispersed on the carrier and, either before or usually afterwards, the other catalyst can be dispersed on the carrier, for instance in the usual way by impregnating with a precursor and calcining to convert the precursor to the other catalyst. The present catalyst itself preferably has a Brunauer Emmett Teller surface area of at least 50, especially at least 100, $m^2g^{-1}$. The catalyst can be employed in the form of pellets. It can be employed on a support, preferably a monolith, for instance a honecomb monolith. The monolith can be metal, in which case it can readily be heated, for instance by passing an electrical current through the metal. Alternatively, the monolith can be ceramic. A separate heater of gas can be utilised up-stream of the catalyst to heat gas to facilitate its reaction on the catalyst.

The invention is illustrated by the accompanying drawings, whose 26 Figures are described in the Examples hereafter.

The invention is illustrated by the following Examples.

EXAMPLE 1

Preparation of Ceria

Ceria was prepared using $Ce(NO_3)_3.6H_2O$ (126 g) and solid NaOH (36 g). The NaOH was dissolved in 6 liters of de-ionised water and brought to the boil. The $Ce(NO_3)_3$ was dissolved in water and made up to 500 $cm^3$. The resulting solution was added dropwise to the boiling NaOH solution to produce a greyish white precipitate. The addition of the $Ce^{3+}$ solution usually lasted over an hour and the final pH was normally about 10. The precipitate was boiled for a further hour, filtered, and then washed free of $NO_3^-$ and $Na^+$. The washed precipitate was dried at 110° C. and then calcined in air at 500° C. Its BET surface was 136 $m^2g^{-1}$.

EXAMPLE 2

Pt-CeO$_2$ Catalyst Made by Co-precipitation Using $Ce^{3+}$ Precursor 50 g of Pt-CeO$_2$ catalyst with a nominal loading of 0.9wt % Pt was prepared using $Ce(NO_3)_3.6H_2O$ (126 g), chloroplatinic acid (1.148 g-Pt assay 39.20 wt %) and solid NaOH (36 g). The NaOH was dissolved in 6 liters of de-ionised water and brought to the boil. The CPA and $Ce(NO_3)_3$ were dissolved in water and made up to 500 $cm^3$ as a single solution. The latter was added dropwise to the boiling NaOH solution to produce a black precipitate. The addition of the CPA/$Ce^{3+}$ solution usually lasted over an hour and the final pH was normally about 10. The precipitate was boiled for a further hour, filtered, and then washed free of $NO_3^-$, $Cl^-$, and $Na^+$. The washed precipitate was dried at 110° C. and then calcined in air at 500° C.

To illustrate the strong Pt-CeO$_2$ interaction achieved by this preparative route, as opposed to a standard impregnation route, a Pt-CeO$_2$ catalyst containing 0.9 wt % Pt was made by incipient wetness of CeO$_2$ (prepared as described in Example 1) with chloroplatinic acid. After drying at 110° C., the sample was calcined at 500° C. Similarly, to define the unique role of $Ce^{3+}$ during the co-precipitation another sample of Pt-CeO$_2$ was made by co-precipitation using $Ce^{4+}$ precursor (cerium ammonium nitrate). This sample is 50 g of Pt-CeO$_2$ catalyst with a nominal loading of 0.9 wt % Pt and was prepared using $(NH_4)_2Ce(NO_3)_6$ (159.3 g), chloroplatinic acid (1.148 g-Pt assay 39.20 wt %) and solid NaOH (48 g). The NaOH was dissolved in 6 liters of de-ionised water and brought to the boil. The CPA and $(NH_4)_2Ce(NO_3)_6$ were dissolved in water and made up to 500 $cm^3$ as a single solution. The latter was added dropwise to the boiling NaOH solution to produce a beige colour precipitate. The slurry was boiled for a further hour, filtered, and then washed free of $NO_3^-$, $Cl^-$, and $Na^+$. The washed precipitate was dried at 110° C. and then calcined in air at 500° C. Analysis of these samples has confirmed a Pt loading of 0.9 wt %.

The BET surface areas and CO chemisorption values (the ratio of CO chemisorbed at room temperature to Pt) of the samples calcined at 500° C. are shown in Table 1.

The strong Pt-CeO$_2$ interaction is typified by the low CO chemisorption value of the catalyst prepared by the co-precipitation route using $Ce^{3+}$ precursor.

TABLE 1

| Catalyst Calcined 500° C. | Preparative route | BET SA $m^2g^{-1}$ | CO Chem CO:Pt |
|---|---|---|---|
| 0.9% Pt—CeO$_2$ | $Ce^{3+}$ + CPA → NaOH | 130 | 0.08 |
| 0.9% Pt—CeO$_2$ | $Ce^{4+}$ + CPA → NaOH | 125 | 0.54 |
| 0.9% Pt/CeO$_2$ | Impregnation | 136 | 0.71 |

Transmission electron microscopy can be used to provide information on the location and the size of metal particles dispersed on an oxide support. HRSTEM (high resolution scanning transmission electron microscopy) micrographs of the Pt-CeO$_2$ catalysts showed very small ceria crystallites (1–25 nm) in all samples. No images of Pt could be recorded, even at a magnification of 25×10$^6$, indicating particles probably less than 1 nm in size (NB, Pt particles greater than 10 nm have been observed on the same instrument, despite the poor contrast between the support and the particles). EDAX (energy dispersive x-ray analysis) has shown Pt dispersed in dense areas of CeO$_2$; the signal was very weak for the co-precipitated catalyst using $Ce^{3+}$, indicating possibly platinum dispersed throughout the sample, whereas a much more intense signal was recorded for the other catalysts, indicating that in the latter cases the Pt was most probably dispersed on the surface.

Figure 1B:
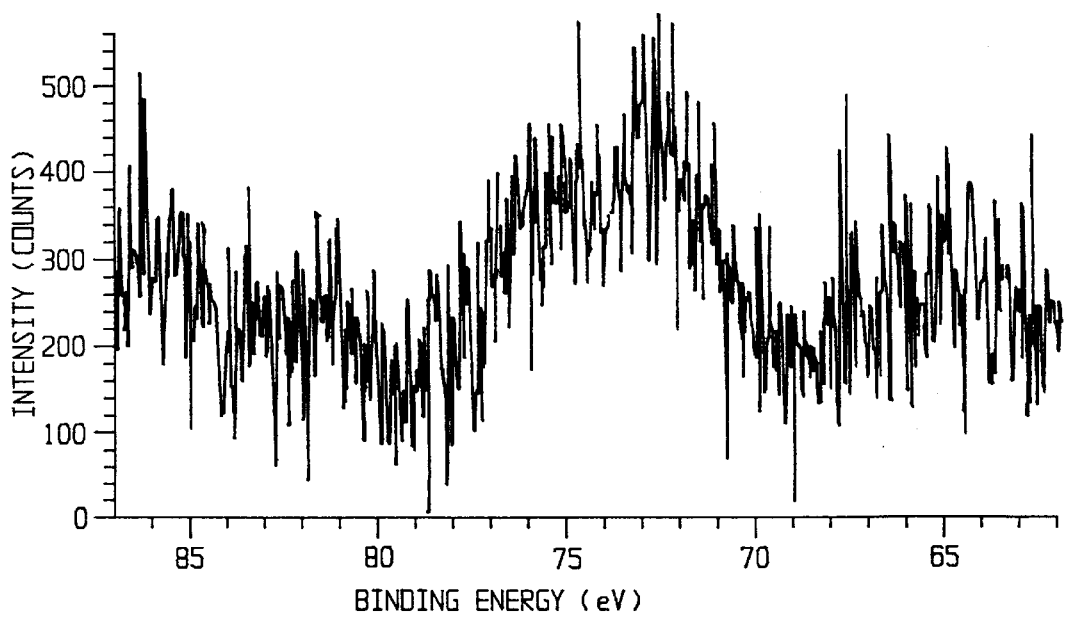

X-ray photoelectron emission spectroscopy (XPS) can detect the electronic state of the catalyst and possibly the location of the metal particles, as the depth of analysis is only a few atomic layers from the surface. The results are summarised in Table 2. Ce was present as $Ce^{4+}$ in all three samples. Catalysts prepared by impregnation or using $Ce^{4+}$ precursor show well defined Pt peaks in the XPS spectra, with Pt in a +2 oxidation state, FIG. 1a. However, catalyst prepared by co-precipitation using $Ce^{3+}$ precursor produced poorly resolved Pt peaks, indicating that the Pt was not totally located on the oxide surface, FIG. 1b.

TABLE 2

| Sample | Preparative Route | Ce Oxidation state | Pt Oxidation state | Pt/Ce Atomic ratio |
|---|---|---|---|---|
| Pt—CeO$_2$ | Ce$^{3+}$ + CPA → NaOH | Ce$^{4+}$ | Undefined | 0.002 |
| Pt—CeO$_2$ | Ce$^{4+}$ + CPA → NaOH | Ce$^{4+}$ | Pt$^{2+}$ | 0.011 |
| Pt—CeO$_2$ | Impregnation | Ce$^{4+}$ | Pt$^{2+}$ | 0.016 |

Extended x-ray absorption fine structure (EXAFS) spectra (Pt L edge) for the different Pt-CeO$_2$ samples, calcined at 500° C., were recorded to provide information about the chemical environment of Pt. The Pt distances used for analysis were those of face-centred cubic Pt and PtO$_2$. The Pt L edge spectra obtained were fitted to those of the reference materials and a summary of the properties derived is given in Table 3.

TABLE 3

| | | EXAFS data | |
|---|---|---|---|
| Sample | Preparative route | % Pt | % PtO$_2$ |
| Pt—CeO$_2$ | Ce$^{3+}$ + CPA → NaOH | 70 | 30 |
| Pt—CeO$_2$ | Ce$^{4+}$ + CPA → NaOH | | 100 |
| Pt/CeO$_2$ | Impregnation | | 100 |

The catalysts prepared by impregnation or using Ce$^{4+}$ precursor contain Pt in a high oxidation state. However, the sample prepared by co-precipitation using Ce$^{3+}$ precursor has a significant portion of Pt in a metallic state. Metallic Pt particles of a similar type were present, if the impregnated catalyst was reduced in H$_2$ at 600° C.

The apparent discrepancy between the Pt oxidation state of IV, indicated by EXAFS in Table 2, and II indicated by XPS in Table 3, in some samples is thought to be due to the material being observed at or towards the surface of the catalyst by XPS and in the bulk of the catalyst by EXAFS. The important point is that both techniques are consistent in indicating well-dispersed platinum in the catalyst prepared by co-precipitation using Ce$^{3+}$ precursor, with EXAFS further indicating that a large proportion of this is in the form of Pt(0).

Figure 2:
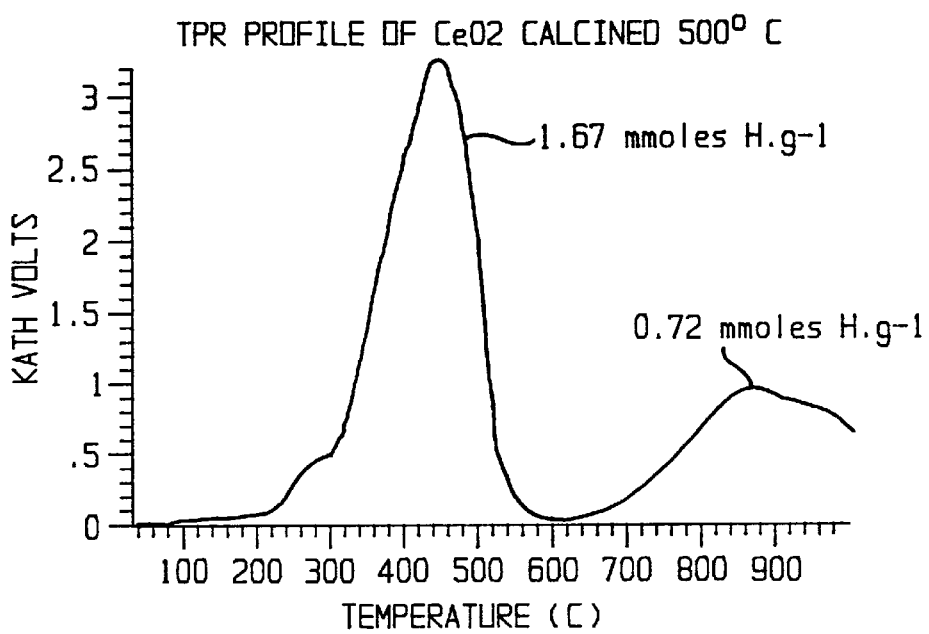
Figure 3:
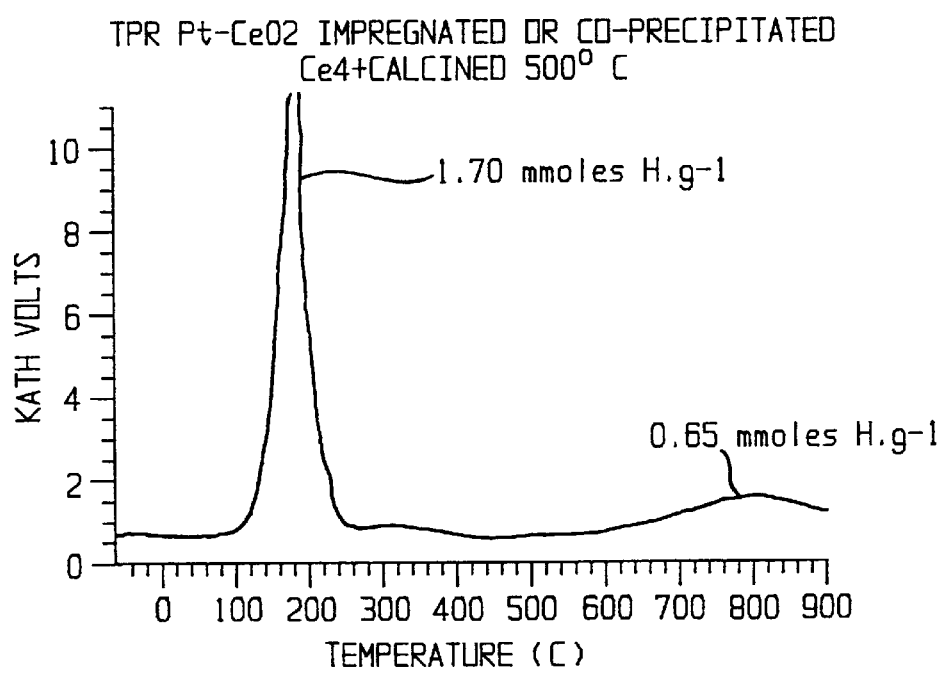
Figure 4:
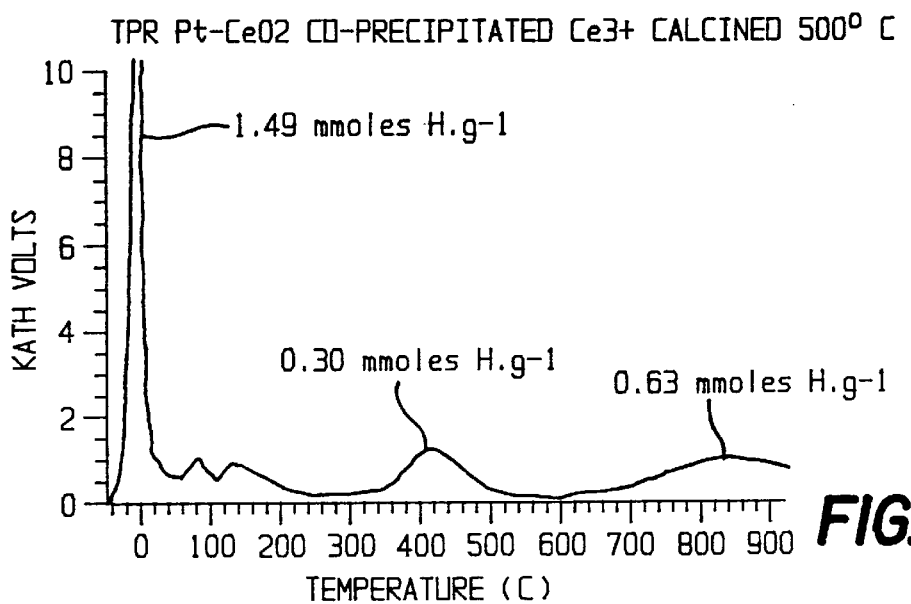

The Pt-CeO$_2$ catalyst, prepared by co-precipitation using Ce$^{3+}$ precursor, possesses a geometric and electronic structure which is significantly different to the other catalysts. These unique features result in a strong metal-metal oxide interaction which can be characterised by the temperature required to form anionic vacancies on the oxide surface, during temperature programmed reduction (tpr). The tpr spectrum of CeO$_2$ is shown in FIG. 2. The presence of two peaks is attributed to two types of oxygen anion in CeO$_2$; the low temperature peak is associated with the reduction of surface anion, whilst the high temperature peak is associated with the bulk reduction of CeO$_2$ to Ce$_2$O$_3$. The addition of Pt to CeO$_2$ by impregnation lowers the position of the first peak, indicating the Pt-CeO$_2$ interaction is mostly a surface effect, FIG. 3, which agrees with the data for this impregnated catalyst in the literature, for instance the Yao and Yu Yao reference specified above. (NB, a small fraction of the hydrogen consumed in the first peak is due to reduction of the platinum oxide). A similar effect is noted from the tpr profile of the co-precipitated catalyst using Ce$^{4+}$ precursor, again shown in FIG. 3 as the trace is substantially identical to that of the impregnated catalyst. The mechanism by which Pt promotes the reduction of surface anion of CeO$_2$ is by the spillover effect described previously. The tpr spectrum of the catalyst prepared using Ce$^{3+}$ precursor is significantly different, FIG. 4. H$_2$ consumption is noted to start at much lower temperature, providing a peak at significantly lower temperature to that noted for the other Pt-CeO$_2$ catalysts. The process is associated mostly with the reduction of surface anion to anionic vacancies in the CeO$_2$ (EXAFS has indicated that Pt is present mostly in a metallic state in the catalyst and therefore cannot contribute significantly to the reduction profile). Furthermore, the tpr spectrum of the catalyst shows an intermediate peak which corresponds to that for the reduction of surface anion on non-metallised CeO$_2$; the complete peak was shifted to lower temperature for the impregnated catalyst. The strong metal-metal oxide interaction caused by preparing Pt-CeO$_2$ catalyst by co-precipitation, using Ce$^{3+}$ precursor, induces anionic vacancy formation in the oxide at low temperature. The effect, however, may not be due to a simple spillover mechanism as observed for the impregnated catalyst, since the reduction of a fraction of the surface anion was not catalysed by the metal and a significant fraction of the metal particles was not localised on the surface. The co-precipitated catalyst prepared via Ce$^{3+}$ precursor is very different in its architecture to the catalysts prepared by impregnation or co-precipitation with Ce$^{4+}$ precursor. The unique activity of these systems is illustrated by their ability to convert CO, NO and alkene at low temperature. This is demonstrated in FIGS. 5–7, which also include the activities of the impregnated catalyst and co-precipitated Ce$^{4+}$ catalyst. The activity was measured in a simulated gas mixture rich of stoichiometric (Table 4) at lambda=0.98.

TABLE 4

| Composition | Concentration/mol % |
|---|---|
| H$_2$ | 0.43 |
| O$_2$ | 0.72 |
| CO | 1.30 |
| CH$_4$ | 0.067 |
| C$_3$H$_8$ | 0.0223 |
| C$_3$H$_6$ | 0.0223 |
| CO$_2$ | 15.0 |
| H$_2$O | 9.2 |
| NO | 0.15 |
| SO$_2$ | 0.002 |
| N$_2$ | Balance |

EXAMPLE 3

Au-CeO$_2$ Catalyst Made by Co-precipitation Using Ce$^{3+}$ Precursor 50 g of Au-CeO$_2$ catalyst, with a nominal loading of 0.9 wt % Au, was prepared using HAuCl$_4$ (0.912 g-assay 49.36 wt % Au), Ce(NO$_3$)$_3$.6H$_2$O (126 g) and solid NaOH (35.91 g). The preparative method was similar to that used in Example 2 for the Pt-CeO$_2$ catalyst. Initially, a very fine black precipitate was produced, but on boiling, a dark purple catalyst was obtained.
A 0.9 wt % Au-CeO$_2$ catalyst was also made by impregnation of HAuCl$_4$ on CeO$_2$.

Figure 8:
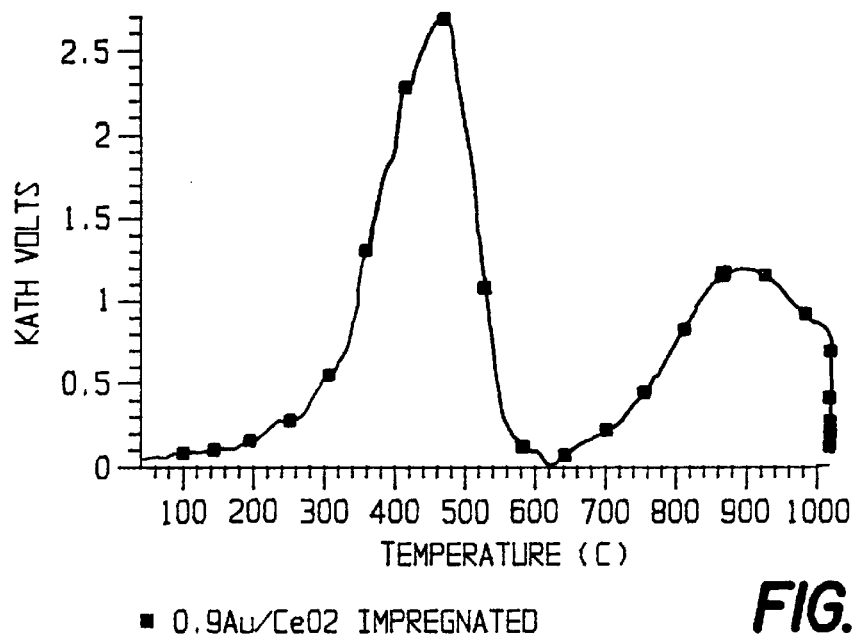
Figure 9:
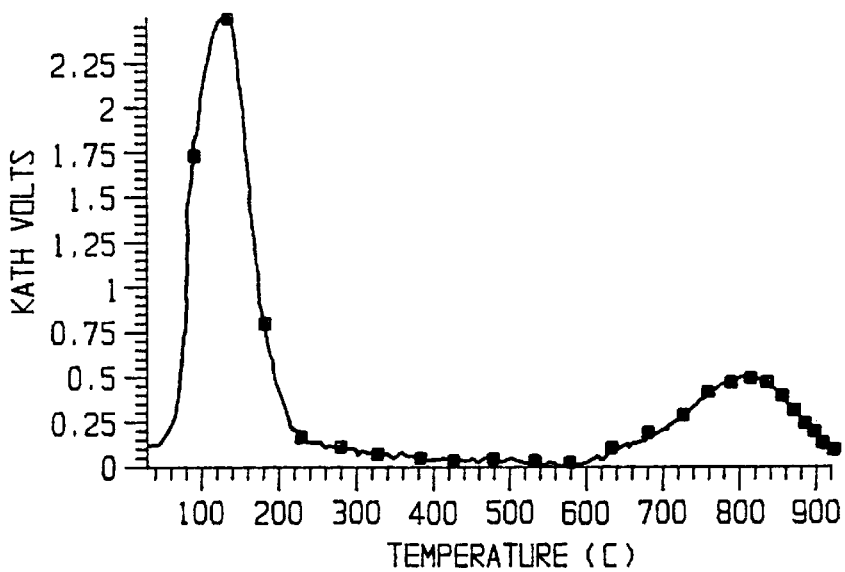

The tpr spectrum of the catalysts after calcination at 500° C. in air is shown in FIGS. 8 and 9 for the impregnated and co-precipitated catalyst respectively. The impregnated catalyst has a tpr profile similar to that of unmetallised CeO$_2$ (FIG. 2) indicating the inability of Au to provide spillover atomic hydrogen. The strong metal-metal oxide interaction achieved by co-precipitation, using Ce$^{3+}$ precursor, is again characterised by the uptake of hydrogen at low temperature, due to the formation of anionic vacancies.

The co-precipitated Au-CeO$_2$ catalyst was similarly capable of converting CO, NO and alkene at lower temperature than the impregnated catalyst, under simulated exhaust condition specified in Table 4 above. The activity of the impregnated catalyst was similar to that of unmetallised CeO$_2$, which was insignificant at temperature below 300° C. The CO and NO conversions at 200° C. at lambda=0.98 are given in Table 5:

TABLE 5

| Catalyst | Preparative Route | CO Oxidation | NO Reduction |
|---|---|---|---|
| Au—CeO$_2$ | Co-precipitated | 55% | 45% |
| Au—CeO$_2$ | Impregnated | 0% | 0% |

EXAMPLE 4

Pd-CeO$_2$ Catalyst Made by Co-precipitation Using Ce$^{3+}$ Precursor 50 g of Pd-CeO$_2$ catalyst with a nominal loading of 0.9 wt % Pd was S prepared using Ce(NO$_3$)$_3$ (126 g), Pd(NO$_3$)$_3$ (5.57 g-assay 8.08% Pd) and solid NaOH (36 g). The preparative route is as described in Example 2.

Figure 10:
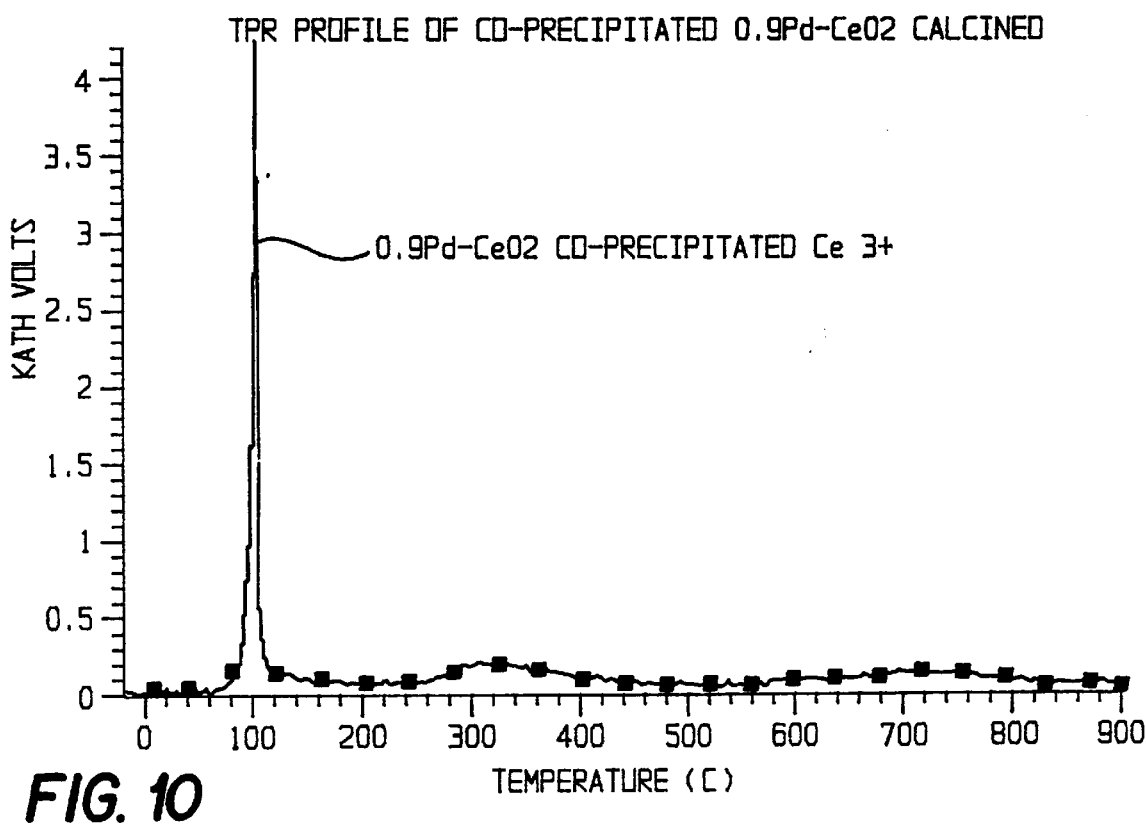
Figure 11:
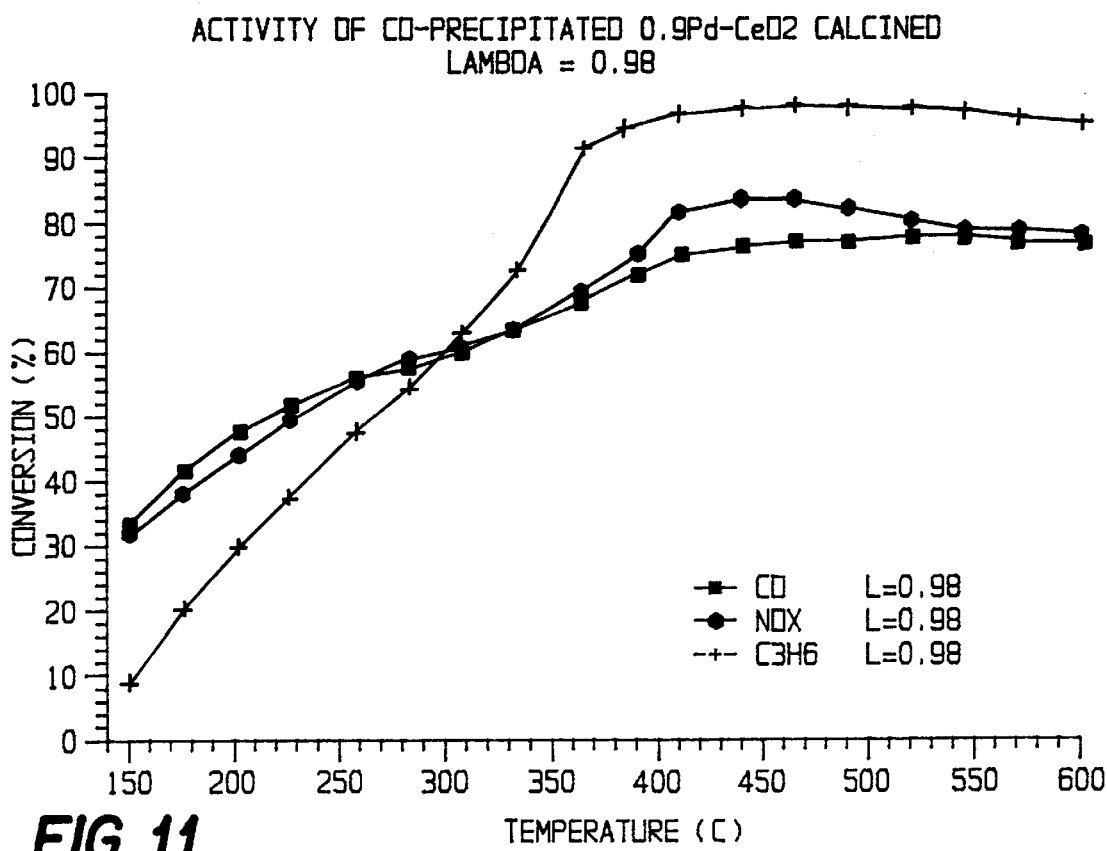

The ability of the metal to promote vacancy formation on the oxide surface at low temperature is illustrated by the tpr spectrum of the sample calcined at 500° C., FIG. 10. The activity of the catalyst measured in a simulated exhaust condition, rich of stoichiometric at lambda=0.98, shown in FIG. 11, again indicates the capability of these catalysts to convert CO, NO and alkene at low temperature.

EXAMPLE 5

Bi-metallic Pd-Pt-CeO$_2$ Catalyst Made by Co-precipitation Using Ce$^{3+}$

A Pd-Pt-CeO$_2$ catalyst of high thermal stability and intrinsic activity for CO, NO, and alkene was made by co-precipitating Pt, Pd with CeO$_2$. The Pt loading was 0.5 wt % and the Pd loading was 4 wt %.

Palladium nitrate (26.04 g-assay 7.68 wt % Pd), chloroplatinic acid (0.638 g-assay 39.2 wt % Pt) and cerous nitrate (126 g) were dissolved in 500 cm$^3$ of de-ionised water. 40 g NaOH was dissolved in 6 liters of water and brought to the boil. The Pd-Pt-Ce$^{3+}$ solution was added dropwise to the NaOH solution to achieve a black precipitate which was then filtered, washed, dried and calcined in air at 500° C. Additionally Ni could be added to the catalyst either during co-precipitation or post-impregnation, to act as an H$_2$S getter.

Figure 13:
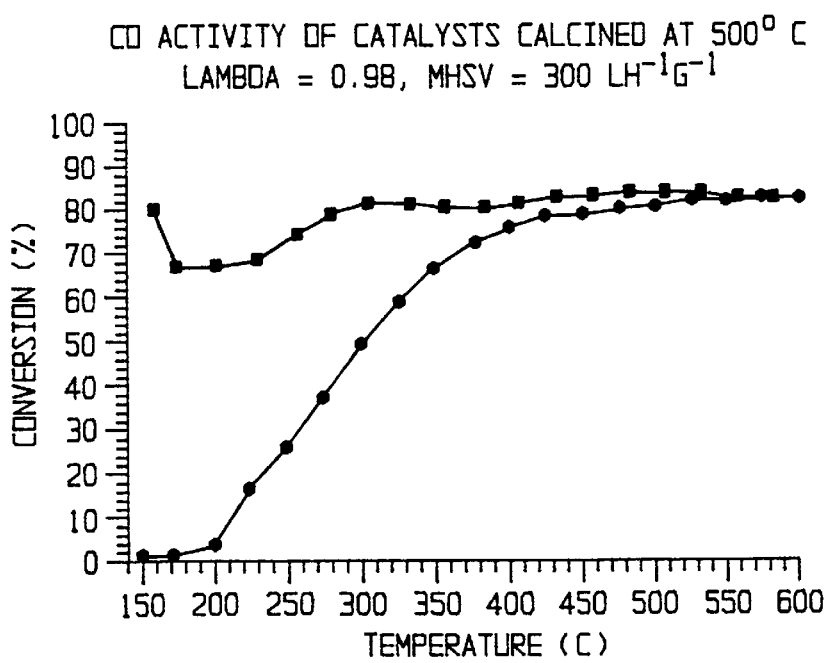
Figure 14:
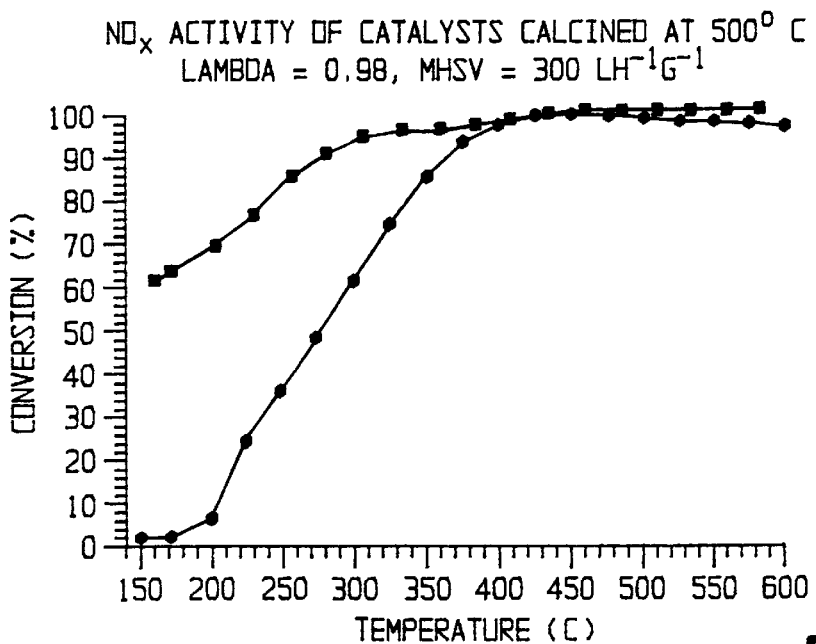
Figure 12:
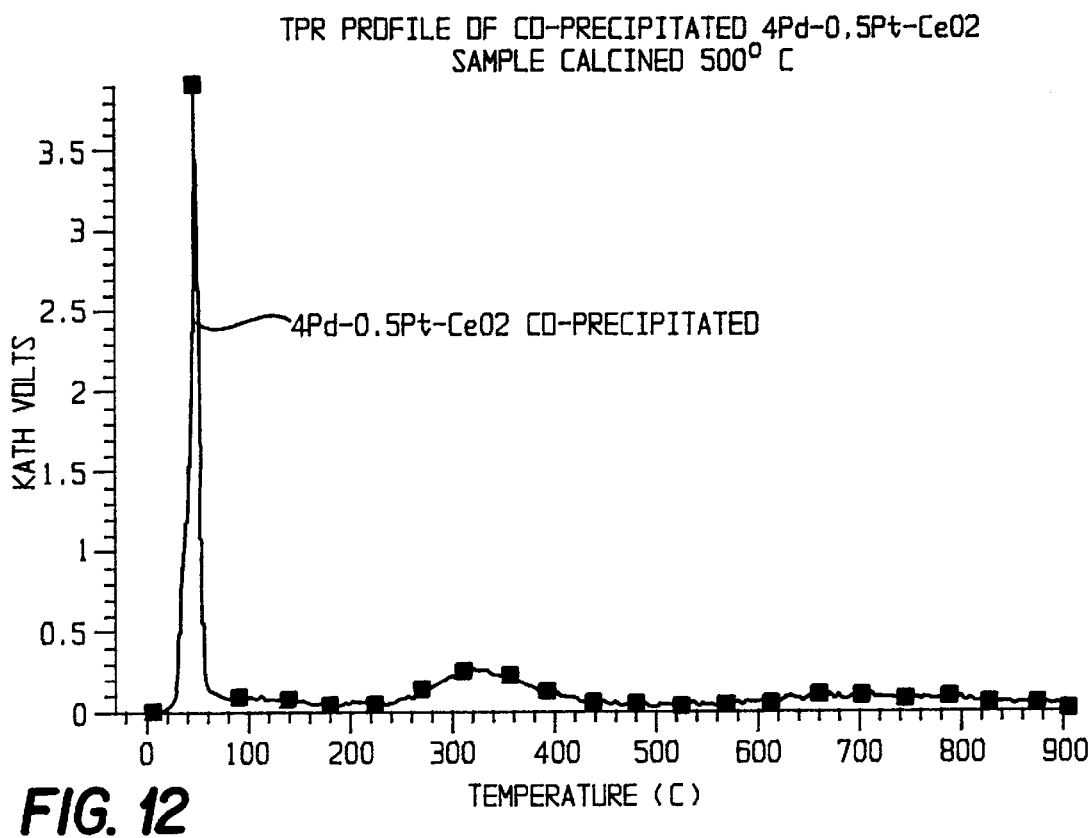
Figure 15:
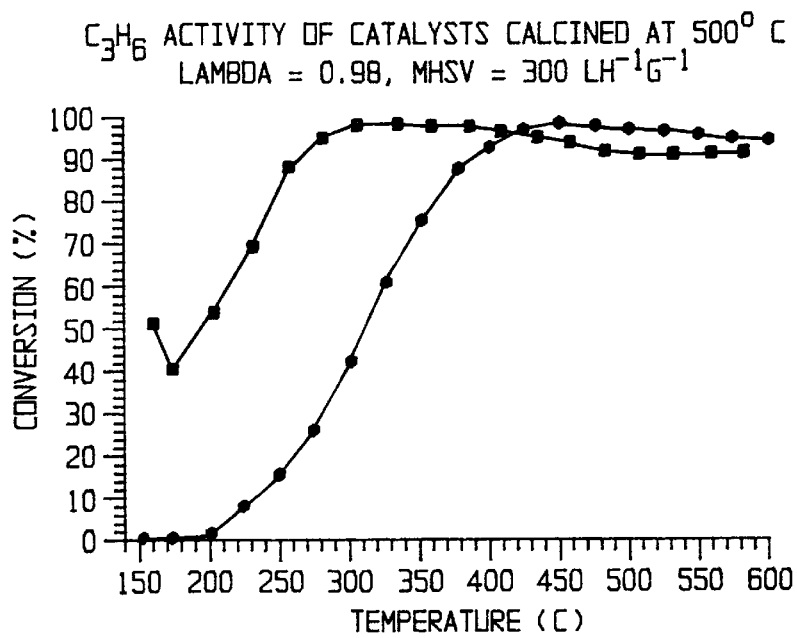
Figure 16:
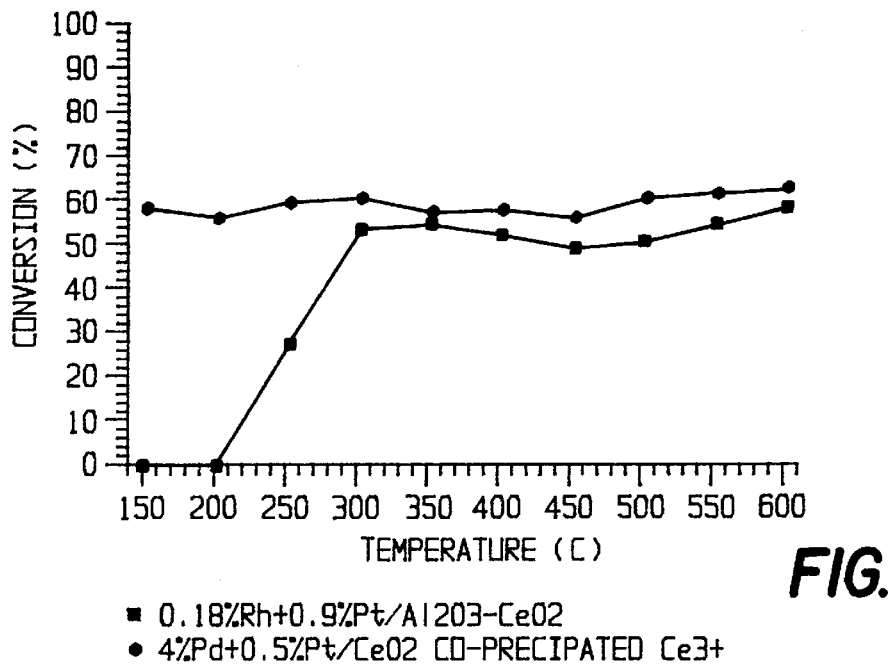
Figure 17:
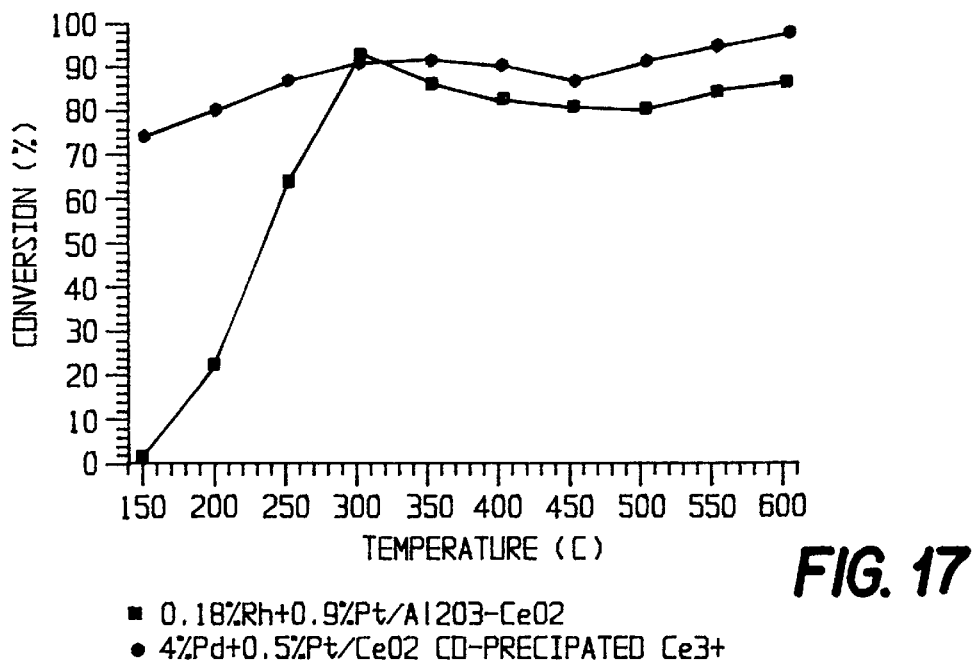
Figure 18:
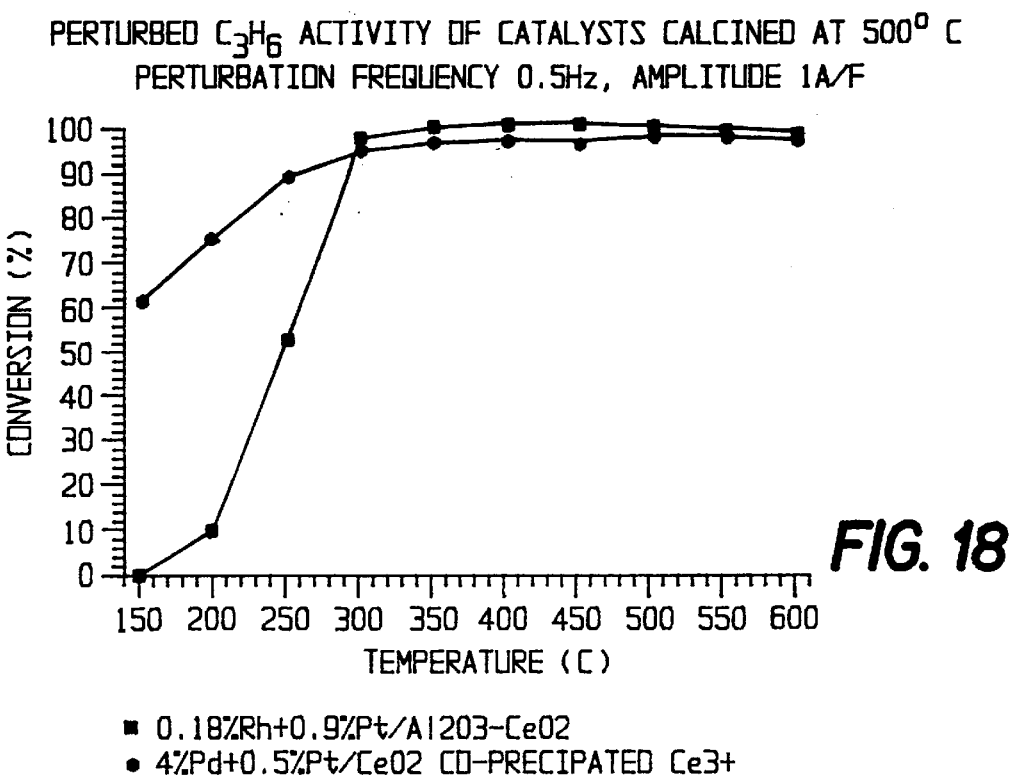

The bi-metallic catalyst has features typical of those of the present catalysts as described above. The tpr spectrum, FIG. 12, indicates the formation of anionic vacancies on the CeO$_2$ surface by the reduction of surface anion of CeO$_2$ at very low temperatures. The activity of the catalyst measured rich of stoichiometric at lambda=0.98 in a simulated gas mixture indicates significant low temperature performance for CO, NO and alkene compared to that indicated by standard Pt-Rh/Al$_2$O$_3$-CeO$_2$ catalyst, FIGS. 13–15. A similar effect is observed when the catalysts are tested under perturbed condition whose details are shown in Table 6 below. The perturbed activity of the Pt-Pd-CeO$_2$ catalyst is significantly higher than the standard catalyst, especially at low temperature, FIGS. 16–18.

TABLE 6

| Composition | Concentration/mol % |
|---|---|
| CO | 0.85 |
| CO$_2$ | 15.0 |
| NO | 0.15 |
| H$_2$ | 0.28 |
| O$_2$ | 0.92 |
| CH$_4$ | 0.0446 |
| C$_3$H$_8$ | 0.015 |
| C$_3$H$_6$ | 0.015 |
| SO$_2$ | 0.002 |
| H$_2$O | 9.0 |

Frequency = 0.5 Hz
Amplitude +/− 1 A/F
Average λ = 1.01

Alternate addition of CO and O$_2$ to the above gas mixture at a frequency of 0.5 Hz.
Rich inject 3.11% CO to achieve CO=3.96% (λ=0.94).
Lean inject 1.41% O$_2$ to achieve O$_2$=2.33% (λ=1.08).
When perturbing, CO stabilises at 2.33% and O$_2$ at 1.55% (λ=1.01).

EXAMPLE 6

Pd-Pt-CeO$_2$-MO (MO=Al$_2$O$_3$) Catalyst Made by Co-precipitation Using Ce$^{3+}$ Precursor To increase the thermal stability of the co-precipitated catalyst, a second metal oxide was incorporated during the co-precipitation process. The role of the secondary metal oxide is to decrease the extent of CeO$_2$ sintering during high temperature exposure.

50 g of a 4%Pd-0.5%Pt-10%Al$_2$O$_3$-CeO$_2$ catalyst were made by the co-precipitation technique described in Example 2, using Ce(NO$_3$)$_3$ (126 g), Al(NO$_3$)$_3$.9H$_2$O (69 g), Pd(NO$_3$)$_3$ (25 g), H$_2$PtCl$_6$ (0.64 g) and NaOH (62.56 g). The metal salts were dissolved as a single solution and added dropwise to the boiling NaOH.

To illustrate the stabilisation effect of Al$_2$O$_3$, BET surface areas of the catalyst were measured after calcination in air at 900° C. The values are given in Table 7.

TABLE 7

| Catalyst Calcined 900° C. | BET Surface Area m$^2$g$^{-1}$ |
|---|---|
| 4% Pd–0.5% Pt—CeO$_2$ | 12.5 |
| 4% Pd–0.5% Pt-10% Al—CeO$_2$ | 64.0 |

Figure 19:
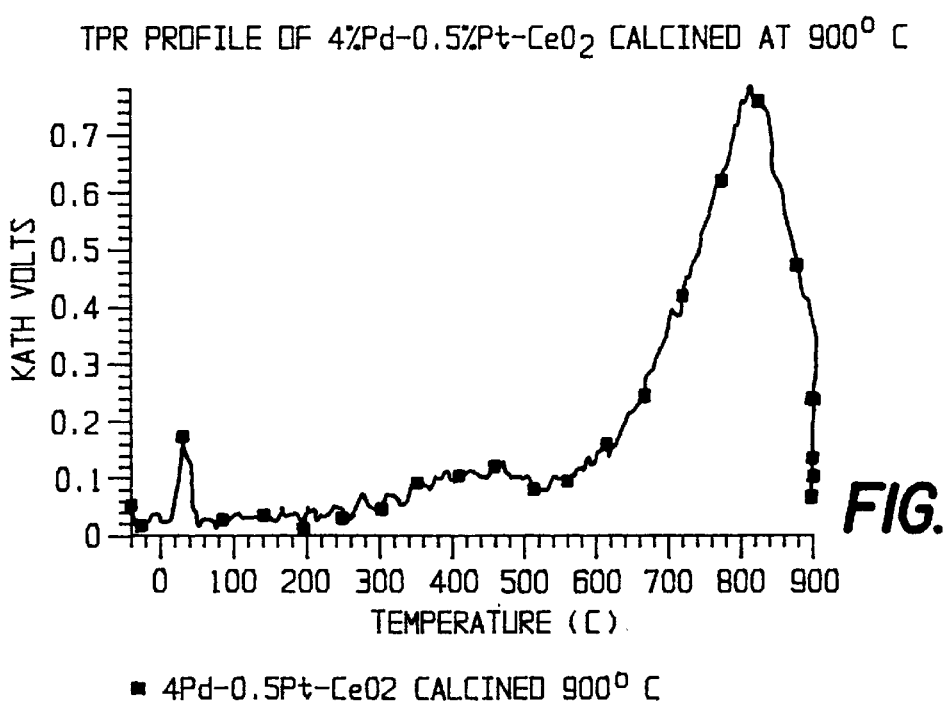
Figure 20:
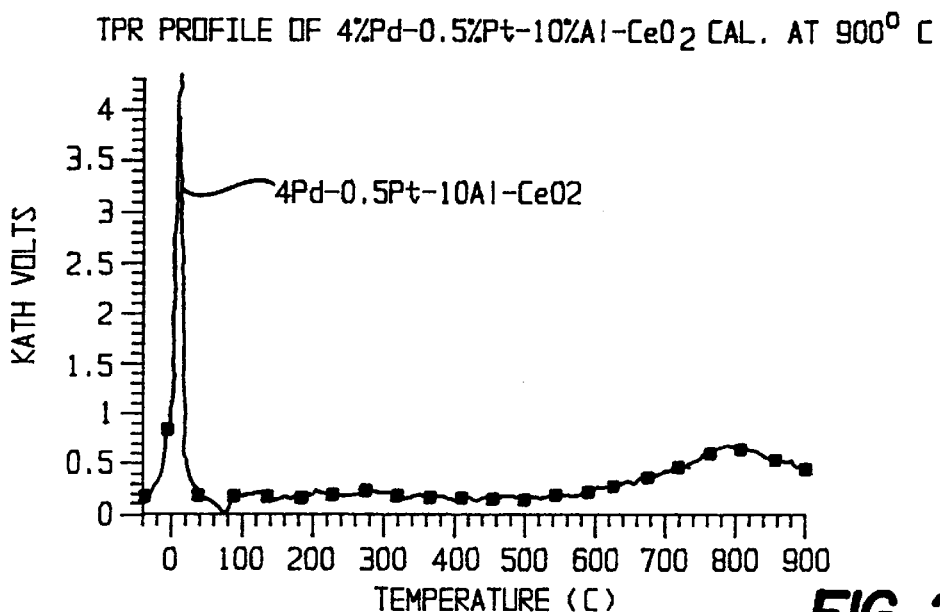
Figure 21:
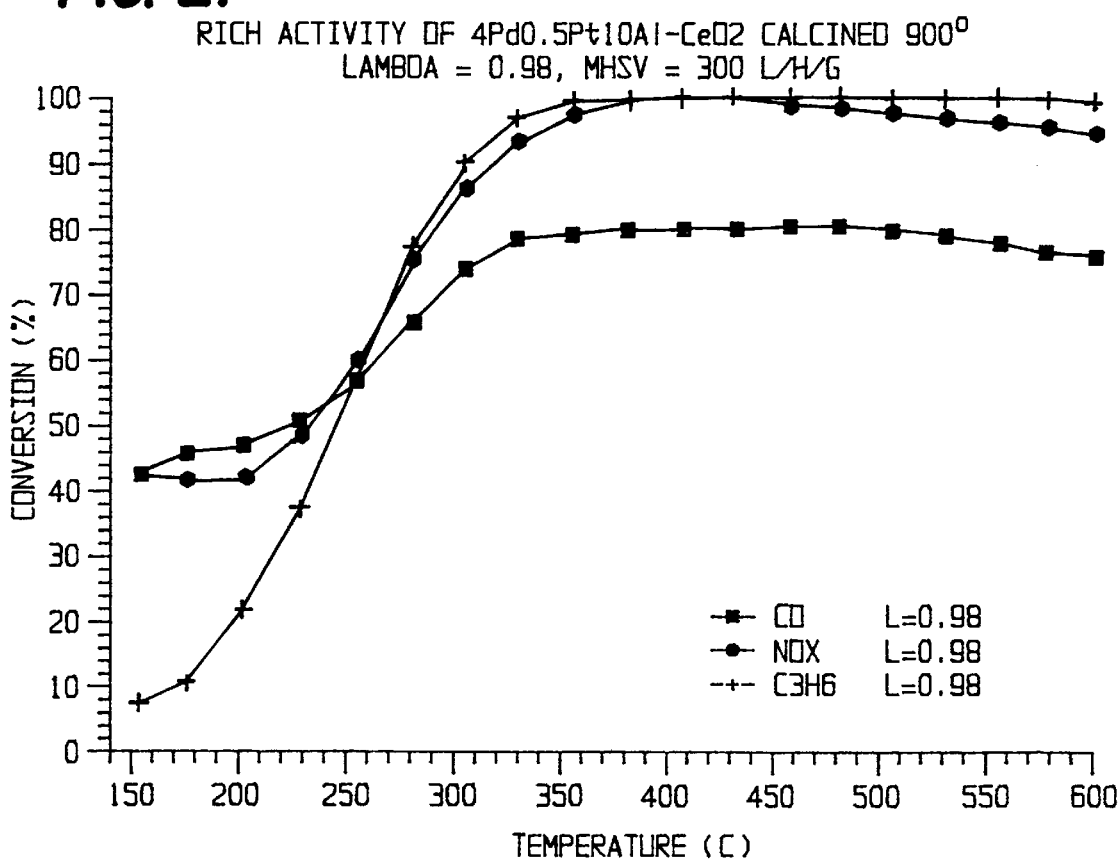

The stabilising effect of alumina is also shown on the tpr profiles of the samples calcined at 900° C., FIGS. 19–20. The sample without Al$_2$O$_3$ has sintered significantly as shown by the increase in the bulk reduction peak (high temperature) relative to the surface reduction peak (low temperature). However, for the Al$_2$O$_3$ doped sample, significant surface reduction peak is maintained. Similarly the Al$_2$O$_3$ doped sample maintains significant low temperature activity even after calcination at 900° C., FIG. 21.

EXAMPLE 7

Pt-MO (MO=CeO$_2$, SnO$_2$) Catalyst Made by Co-precipitating Pt Colloid with Ce$^{4+}$ or Sn$^{4+}$ Precursor In this preparative route, the source of small metal particles is pre-formed metal colloids.

To make 50 g of 0.9 wt % Pt-$CeO_2$ catalyst, 166 g of ceric ammonium nitrate $(NH_4)_2Ce(NO_3)_6$ was dissolved in 500 $cm^3$ of $H_2O$. A Pt sol was prepared to contain 2.1 g Pt per liter, and 215 $cm^3$ of the sol was diluted to 500 $cm^3$ with distilled water. 73 g of crystalline NaOH was dissolved in 6 liters of water and brought to the boil. The Pt sol and ceric solution were added separately at a constant flow rate to the NaOH solution. After complete addition, the precipitate was boiled for an hour prior to filtration, washing, drying and calcination in air at 500° C.

Similarly, to make 50 g of 0.9 wt % Pt-$SnO_2$ catalyst, 116.3 g $SnCl_4.5H_2O$ was dissolved in 500 $cm^3$ of $H_2O$. 215 $cm^3$ of a Pt sol of known concentration, 2.1 g Pt per liter, was diluted to 500 $cm^3$ with de-ionised water. 54 g of crystalline NaOH was dissolved in 6 liters of water and brought to the boil. The Pt sol and the Sn(IV) solution were added to the boiling NaOH separately, but simultaneously, and at a constant flow rate. The grey precipitate was boiled for an hour after complete addition of the precursor solutions. The precipitate was filtered hot, then washed, dried and calcined in air at 500° C.

Figure 22:
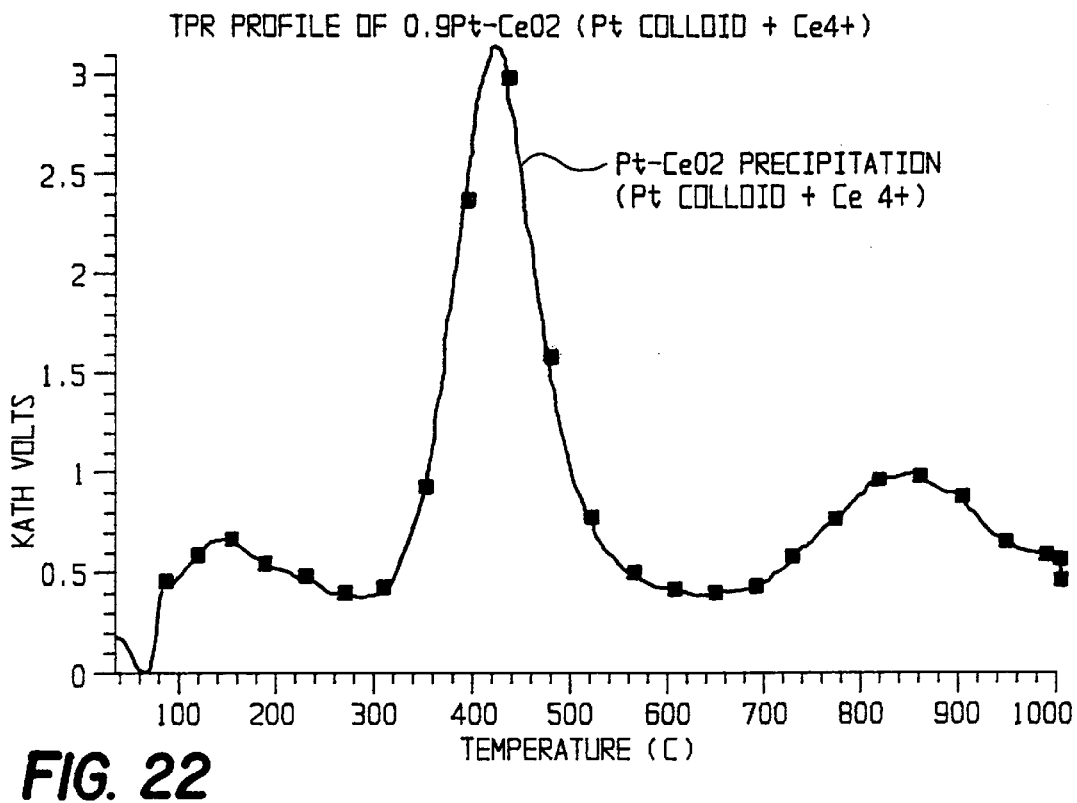
Figure 23:
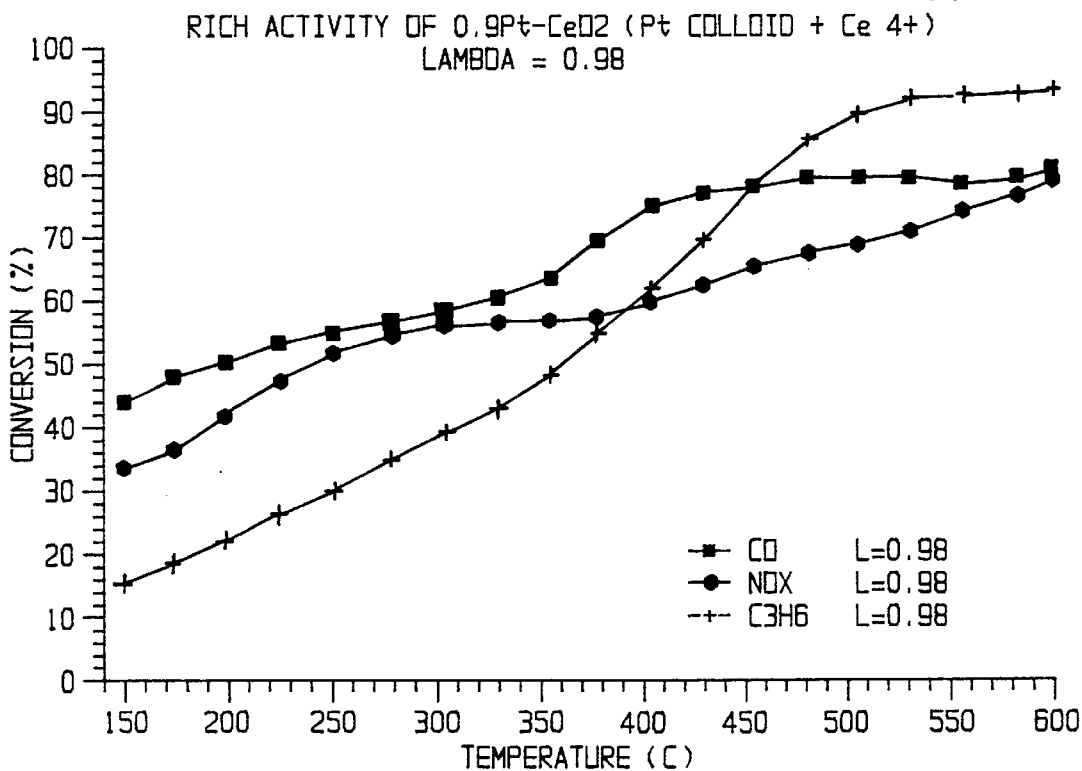

The Pt-$CeO_2$ catalyst, made by this preparative route, has a reduction profile, FIG. 22, indicative of the strong metal-metal oxide interaction identified by promotion of reduction of surface anion at low temperature, which indicates the formation of anionic vacancies on the $CeO_2$ surface. Similarly, the catalyst can promote CO, NO and alkene conversion at low temperature in a simulated exhaust condition rich of stoichiometric at lambda=0.98, FIG. 23. The Pt-$SnO_2$ catalyst will promote low temperature conversion of CO and alkene when under lean of stoichiometric.

EXAMPLE 8

M-$ZrO_2$ (M=Au, Pt or Pd) Catalyst Made by Co-precipitation in the Presence of a Reducing Agent In this preparative route, the small particles of the metal are formed in situ, by the action of a reducing agent on hydrolysed salt of the metal.

50 g of 4.0 wt % Au-$ZrO_2$ catalyst was prepared using $ZrOCl_2.8H_2O$ (130.71 g), $HAuCl_4$ (4.059 g-assay 49.27 wt % Au), NaOH pellets (40.97 g) and HCOONa (1.66 g). The zirconyl chloride and auric acid were dissolved together in 500 $cm^3$ of water, whilst the sodium hydroxide and sodium formate were dissolved in a similar volume of water. These two solutions were added separately, but at the same rate and simultaneously, to 6 liters of boiling distilled water, whilst maintaining a constant pH of 7. After complete addition, the purple gelatinous precipitate was boiled for a further fifteen minutes, prior to filtration, washing, drying and calcining at 500° C.

Figure 24:
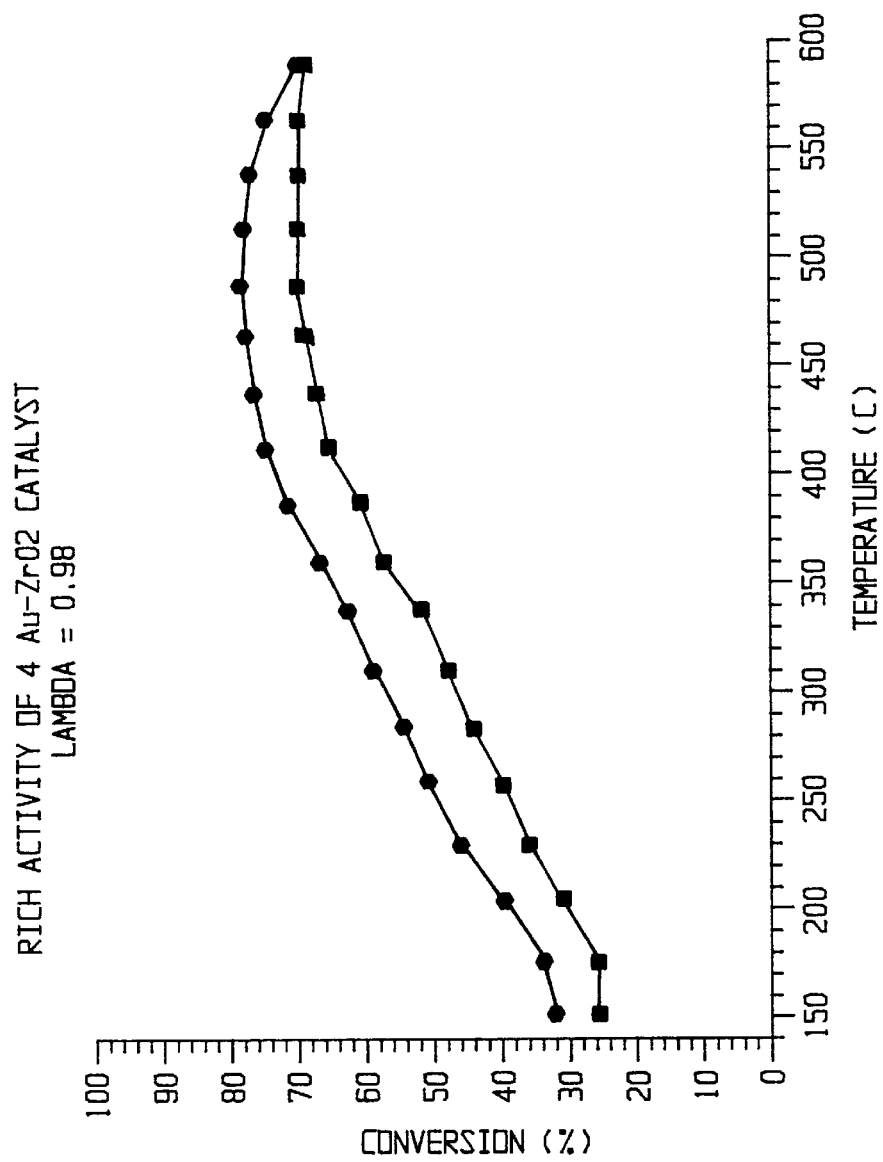
Figure 25:
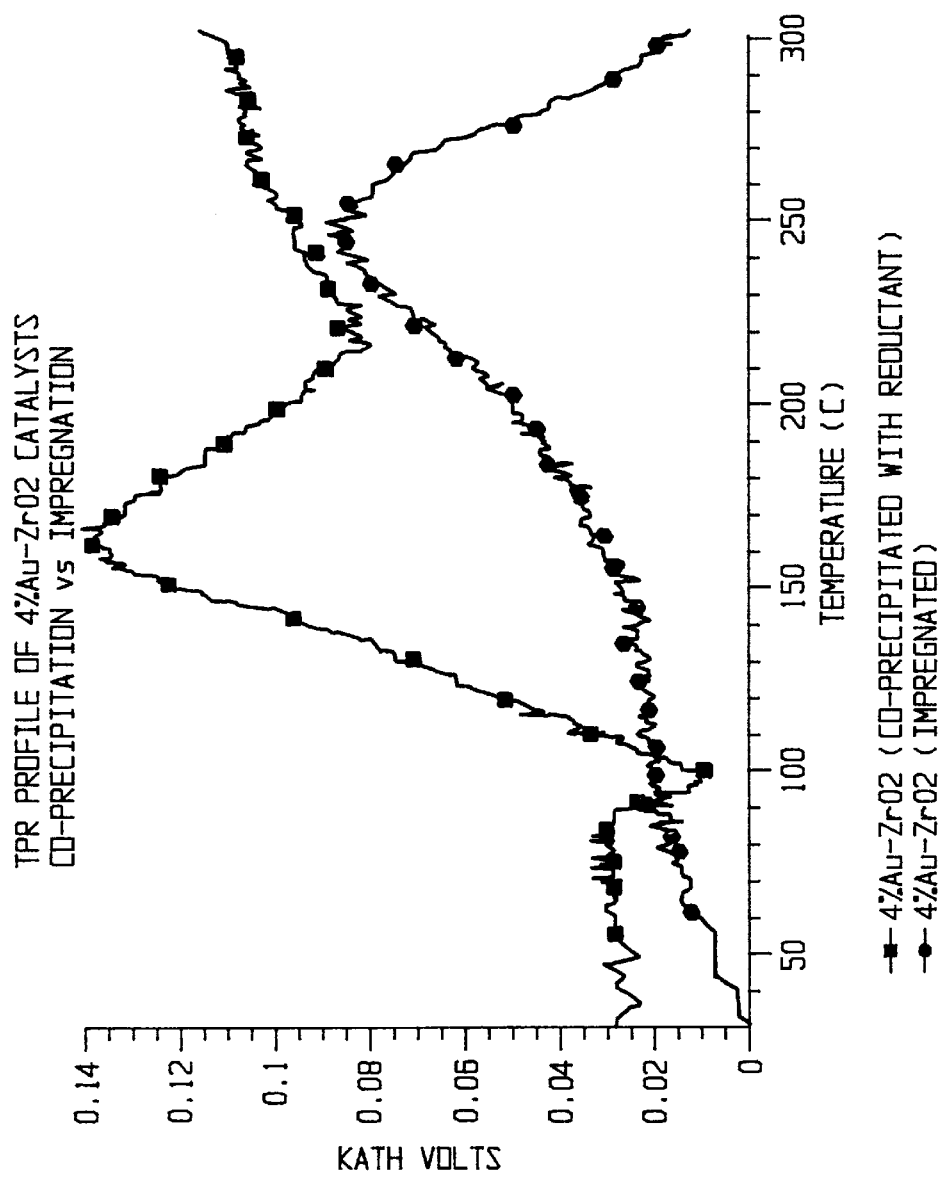

The Au-$ZrO_2$ catalyst prepared by the above route is capable of converting CO and NO at low temperature in a simulated exhaust gas mixture, rich of stoichiometric at lambda=0.98, FIG. 24. The strong Au-$ZrO_2$ interaction achieved through this preparative route is demonstrated by the presence of low temperature reduction peak in the tpr profile, which indicates the formation of anionic vacancies on the $ZrO_2$ surface; a corresponding catalyst made by impregnation consumes $H_2$ at higher temperature—FIG. 25 (NB, a Au-$Al_2O_3$ catalyst made by impregnation, after calcination at 500° C., does not show any $H_2$ consumption during tpr, indicating that the reduction peak of the Au-$ZrO_2$ system is not due to reducibility of the Au species, which should be present in a metallic state).

COMPARATIVE EXAMPLE

Figure 5:
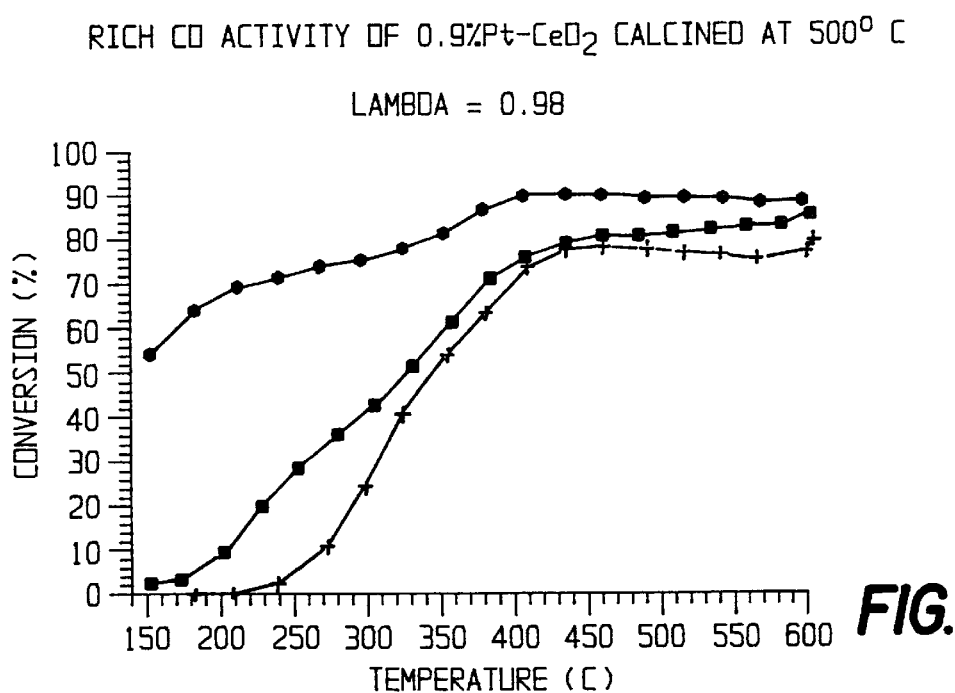
Figure 26:
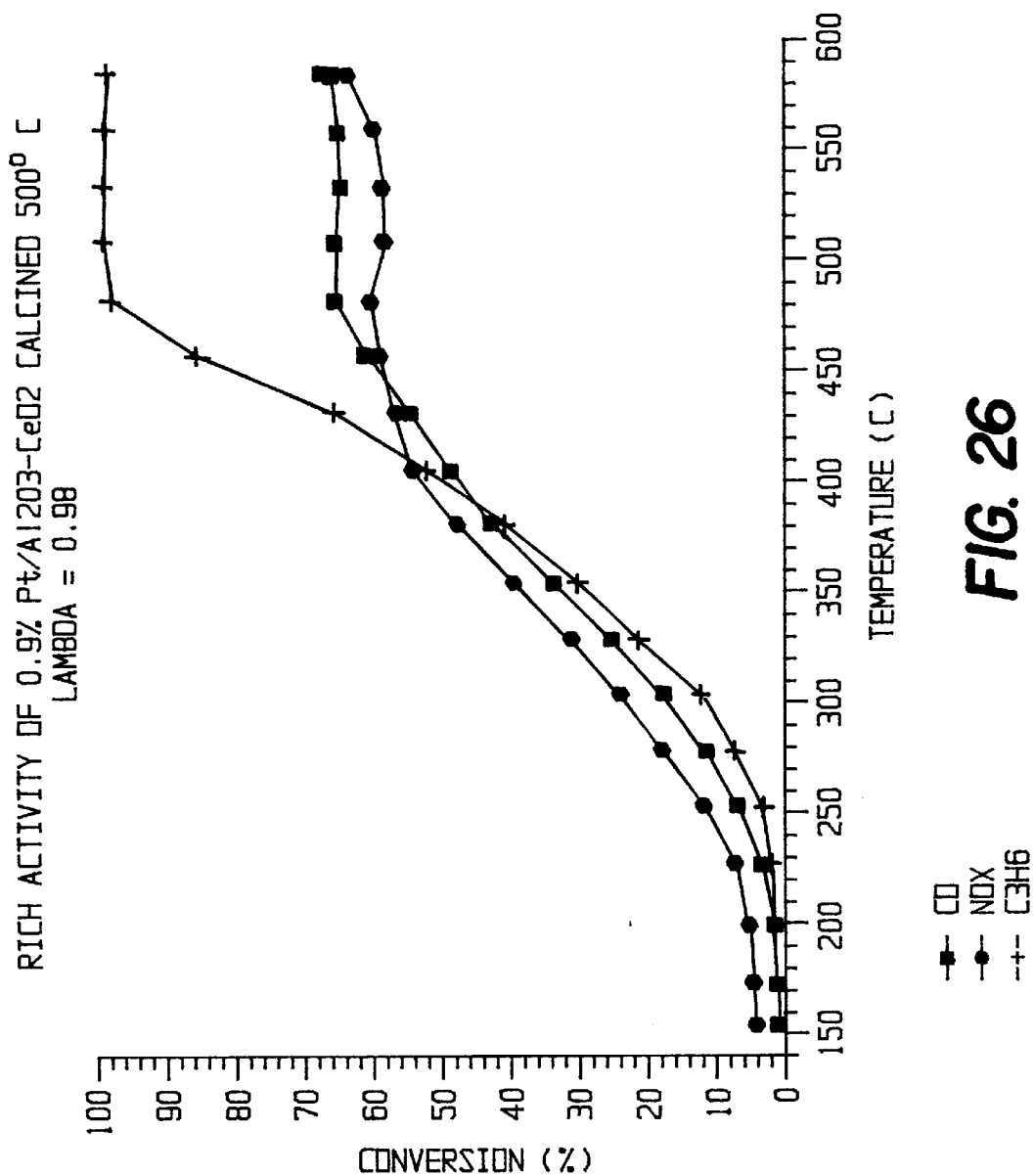

A catalyst containing 0.9% Pt and 20% $CeO_2$ was prepared by conventional impregnation of conventional $Al_2O_3$-$CeO_2$ with a Pt precursor and then calcination at 500° C. The catalyst was tested for its ability to convert CO, NO and alkene in the same way as were the catalysts described in Example 2. The results for this comparative are shown in FIG. 26. Comparison with FIGS. 5–7 shows the greater low temperature activity of the catalyst of the invention.

We claim:

1. A method of conducting a chemical reaction employing a catalyst composed of metal oxide particles among which are uniformly incorporated noble metal particles, the catalyst having such a high interaction between the noble metal particles and the metal oxide particles that, without hydrogen reduction pre-treatment, it exhibits the formation of anionic vacancies on the metal oxide surface at a temperature lower than that of the corresponding catalyst, without hydrogen reduction pre-treatment, containing the same amount of the metal oxide particles and noble metal particles and prepared by impregnating the metal oxide particles with noble metal precursor and calcining to convert the precursor to the noble metal particles, wherein the metal oxide comprises $CeO_2$ and the noble metal is one or more members selected from the group consisting of Pt, Pd, Rh and Au.

2. A method according to claim 1 wherein the catalyst is employed without hydrogen reduction pre-treatment.

3. A method according to claim 1 wherein the catalyst is employed after a calcination pre-treatment in air at between 500 and 900° C.

4. A method according to claim 1 wherein the reaction is a redox reaction.

5. A method according to claim 1, wherein the reaction is the oxidation of carbon monoxide and hydrocarbon to carbon dioxide and water and the reduction of nitrogen oxides to nitrogen.

6. A method according to claim 1, wherein the catalyst contains 0.1 to 30% by weight of the noble metal particles based on the total weight of the noble metal particles and the metal oxide particles.

7. A method according to claim 1, wherein the noble metal particle diameter is less than 10 Å.

8. A method according to claim 1, wherein the metal oxide particle diameter is up to 250 Å.

9. A method according to claim 1, wherein the noble metal is one or more members selected from the group consisting of Pt, Pd and Rh.

10. A method according to claim 1, wherein the metal oxide further comprises one or more members selected from the group consisting of $ZrO_2$, $TiO_2$ and $SnO_2$.

11. A method according to claim 1, wherein the catalyst is prepared by co-precipitation of the noble metal particles and the metal oxide particles.

12. A method according to claim 1, which occurs in the exhaust apparatus of an engine, in order to combat air pollution.

13. A method according to claim 12, wherein the engine is an internal combustion engine in a vehicle.

* * * * *